(12) United States Patent
Weisenburger et al.

(10) Patent No.: US 8,897,541 B2
(45) Date of Patent: Nov. 25, 2014

(54) ACCURATE DIGITIZATION OF A GEOREFERENCED IMAGE

(75) Inventors: Shawn D. Weisenburger, Christchurch (NZ); Peter G. France, Christchurch (NZ); James M. Janky, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 471 days.

(21) Appl. No.: 13/152,996

(22) Filed: Jun. 3, 2011

(65) Prior Publication Data

US 2011/0235923 A1 Sep. 29, 2011

Related U.S. Application Data

(63) Continuation-in-part of application No. 12/559,322, filed on Sep. 14, 2009.

(51) Int. Cl.
| | | |
|---|---|---|
| *G06K 9/00* | (2006.01) | |
| *G01C 11/00* | (2006.01) | |
| *G06T 7/00* | (2006.01) | |
| *G01C 15/00* | (2006.01) | |

(52) U.S. Cl.
CPC .............. *G01C 15/00* (2013.01); *G01C 11/00* (2013.01); *G06T 2207/10032* (2013.01); *G06T 7/0042* (2013.01); *G06T 2207/30184* (2013.01); *Y10S 707/919* (2013.01)
USPC ............. 382/154; 382/113; 345/629; 702/95; 707/919

(58) Field of Classification Search
CPC ....... G06T 17/05; G06T 17/00; G06K 9/0063
USPC ........................................................... 702/95
See application file for complete search history.

(56) References Cited

U.S. PATENT DOCUMENTS

| | | |
|---|---|---|
| 5,003,329 A | 3/1991 | Itabashi |
| 5,087,916 A | 2/1992 | Metzdorff et al. |
| 5,103,250 A | 4/1992 | Arifuku et al. |
| 5,229,552 A | 7/1993 | Cole |
| 5,247,356 A | 9/1993 | Ciampa |
| 5,427,356 A | 6/1995 | Krotov et al. |
| 5,506,644 A | 4/1996 | Suzuki et al. |
| 5,517,419 A | 5/1996 | Lanckton et al. |
| 5,581,299 A | 12/1996 | Raney |
| 5,596,494 A | 1/1997 | Kuo |

(Continued)

FOREIGN PATENT DOCUMENTS

JP 200724859 A 2/2007

OTHER PUBLICATIONS

Pawelka, Elizabeth "Make your 3270 applications accessible from PDAs and cell phones", *CCR2: A Publication for the IBM System z Software Community*, Issue 6., (2008),6 pages.

(Continued)

*Primary Examiner* — Sangwoo Ahn

(57) ABSTRACT

A method of implementing accurate digitization from a georeferenced image is described. In one embodiment, at least one set of coordinates which have been measured at a point of interest is received. A correction is then determined which describes a difference between the at least one set of coordinates and a set of georeferenced coordinates from a georeferenced image of the point of interest which describes the position of the point of interest.

15 Claims, 27 Drawing Sheets

---

2100

USE A COMPUTER SYSTEM TO RECEIVE AT LEAST ONE SET OF COORDINATES WHICH HAVE BEEN MEASURED AT A POINT OF INTEREST
2110

↓

USE THE COMPUTER SYSTEM TO DETERMINE A CORRECTION WHICH DESCRIBES A DIFFERENCE BETWEEN THE AT LEAST ONE SET OF COORDINATES AND A SET OF GEOREFERENCED COORDINATES WHICH DESCRIBE THE POSITION OF THE POINT OF INTEREST WITHIN A GEOREFERENCED IMAGE
2120

↓

USE THE COMPUTER SYSTEM TO APPLY THE CORRECTION TO A SECOND SET OF COORDINATES OF THE GEOREFERENCED IMAGE TO DESCRIBE THE POSITION OF A SECOND POINT OF INTEREST
2130

(56) References Cited

U.S. PATENT DOCUMENTS

| | | | |
|---|---|---|---|
| 5,633,946 A | 5/1997 | Lachinski et al. |
| 5,646,207 A | 7/1997 | Schell |
| 5,689,742 A | 11/1997 | Chamberlain |
| 5,719,773 A | 2/1998 | Choate |
| 5,768,640 A | 6/1998 | Takahashi et al. |
| 5,845,161 A | 12/1998 | Schrock et al. |
| 5,897,728 A | 4/1999 | Cole et al. |
| 5,902,347 A | 5/1999 | Backman et al. |
| 5,913,078 A | 6/1999 | Kimura et al. |
| 5,922,939 A | 7/1999 | Cota |
| 5,966,122 A | 10/1999 | Itoh |
| 5,969,243 A | 10/1999 | Frey et al. |
| 5,991,690 A | 11/1999 | Murphy |
| 5,995,681 A | 11/1999 | Lee et al. |
| 6,009,359 A | 12/1999 | El-Hakim et al. |
| 6,070,682 A | 6/2000 | Isogai et al. |
| 6,076,917 A | 6/2000 | Wen |
| 6,085,135 A | 7/2000 | Steckel |
| 6,128,446 A | 10/2000 | Schrock et al. |
| 6,141,614 A | 10/2000 | Janzen et al. |
| 6,185,990 B1 | 2/2001 | Missotten et al. |
| 6,205,397 B1 | 3/2001 | Eslambolchi et al. |
| 6,222,985 B1 | 4/2001 | Miyake et al. |
| 6,282,362 B1 | 8/2001 | Murphy et al. |
| 6,337,951 B1 | 1/2002 | Nakamura |
| 6,346,980 B1 | 2/2002 | Tani et al. |
| 6,401,069 B1 | 6/2002 | Boys et al. |
| 6,504,571 B1 | 1/2003 | Narayanaswami et al. |
| 6,542,813 B1 | 4/2003 | Kovacs |
| 6,574,561 B2 | 6/2003 | Alexander et al. |
| 6,577,275 B2 | 6/2003 | Turner |
| 6,597,818 B2 | 7/2003 | Kumar et al. |
| 6,690,883 B2 | 2/2004 | Pelletier |
| 6,732,162 B1 | 5/2004 | Wood et al. |
| 6,741,948 B2 * | 5/2004 | Hauger et al. ................ 702/152 |
| 6,757,445 B1 | 6/2004 | Knopp |
| 6,802,205 B2 | 10/2004 | Barguirdjian et al. |
| 6,868,340 B2 | 3/2005 | Alexander et al. |
| 6,904,160 B2 | 6/2005 | Burgess |
| 6,917,206 B2 | 7/2005 | Rains et al. |
| 6,975,942 B2 | 12/2005 | Young et al. |
| 6,993,196 B2 | 1/2006 | Sun et al. |
| 7,038,681 B2 | 5/2006 | Scott et al. |
| 7,099,492 B2 | 8/2006 | Rhoads |
| 7,106,328 B2 | 9/2006 | Royan |
| 7,148,898 B1 | 12/2006 | Howard et al. |
| 7,161,604 B2 | 1/2007 | Higgins et al. |
| 7,167,187 B2 | 1/2007 | Scott et al. |
| 7,171,389 B2 | 1/2007 | Harrison |
| 7,191,056 B2 | 3/2007 | Costello et al. |
| 7,234,106 B2 | 6/2007 | Simske |
| 7,248,285 B2 | 7/2007 | Needham |
| 7,248,968 B2 | 7/2007 | Reid |
| 7,254,485 B2 | 8/2007 | Rooney et al. |
| 7,283,975 B2 | 10/2007 | Broughton |
| 7,313,604 B2 | 12/2007 | Wood et al. |
| 7,411,493 B2 | 8/2008 | Smith |
| 7,424,335 B2 | 9/2008 | Swift |
| 7,430,455 B2 | 9/2008 | Casey et al. |
| 7,447,613 B2 | 11/2008 | Mertins et al. |
| 7,465,323 B2 | 12/2008 | Au et al. |
| 7,466,244 B2 | 12/2008 | Kimchi et al. |
| 7,482,973 B2 | 1/2009 | Tucker et al. |
| 7,502,490 B2 | 3/2009 | Rhoads et al. |
| 7,508,840 B2 | 3/2009 | Delaney |
| 7,516,563 B2 | 4/2009 | Koch |
| 7,541,975 B2 | 6/2009 | Sever et al. |
| 7,617,246 B2 | 11/2009 | Koch et al. |
| 7,634,380 B2 | 12/2009 | Martin et al. |
| 7,658,096 B2 | 2/2010 | Pinto et al. |
| 7,663,671 B2 | 2/2010 | Gallagher et al. |
| 7,664,233 B1 | 2/2010 | Kirchmeier et al. |
| 7,689,356 B2 | 3/2010 | Dix et al. |
| 7,720,703 B1 | 5/2010 | Broughton |
| 7,724,130 B2 | 5/2010 | Norstrom et al. |
| 7,766,547 B2 | 8/2010 | Weppenaar et al. |
| 7,813,741 B2 | 10/2010 | Hendrey et al. |
| 7,836,760 B2 | 11/2010 | Saylor |
| 7,872,669 B2 | 1/2011 | Darrell et al. |
| 7,899,272 B1 | 3/2011 | Hsu |
| 7,974,853 B1 | 7/2011 | Zimmerman |
| 8,018,376 B2 | 9/2011 | McClure et al. |
| 8,098,894 B2 | 1/2012 | Soderstrom |
| 8,105,720 B2 | 1/2012 | Koenig et al. |
| 8,108,144 B2 | 1/2012 | Forstall et al. |
| 8,131,118 B1 | 3/2012 | Jing et al. |
| 8,296,056 B2 | 10/2012 | Becker et al. |
| 8,385,964 B2 | 2/2013 | Haney |
| 8,405,740 B2 | 3/2013 | Nichols et al. |
| 8,520,979 B2 | 8/2013 | Conwell |
| 8,564,643 B1 | 10/2013 | Maali et al. |
| 8,611,677 B2 | 12/2013 | Das et al. |
| 2001/0024174 A1 | 9/2001 | Turner |
| 2001/0026271 A1 | 10/2001 | Higgins et al. |
| 2001/0028348 A1 | 10/2001 | Higgins et al. |
| 2002/0055902 A1 | 5/2002 | Faeth |
| 2002/0120424 A1 | 8/2002 | Hauger et al. |
| 2002/0198736 A1 | 12/2002 | Harrison |
| 2003/0052896 A1 | 3/2003 | Higgins et al. |
| 2003/0182260 A1 | 9/2003 | Pickett et al. |
| 2003/0187560 A1 | 10/2003 | Keller et al. |
| 2003/0202104 A1 | 10/2003 | Werner |
| 2004/0032531 A1 | 2/2004 | Mercier |
| 2004/0100285 A1 | 5/2004 | Rains et al. |
| 2004/0161131 A1 | 8/2004 | Rhoads |
| 2004/0168148 A1 | 8/2004 | Goncalves et al. |
| 2004/0203571 A1 | 10/2004 | Hashizume |
| 2004/0225444 A1 | 11/2004 | Young et al. |
| 2005/0031197 A1 | 2/2005 | Knopp |
| 2005/0034062 A1 | 2/2005 | Bufkin et al. |
| 2005/0038587 A1 | 2/2005 | Berg et al. |
| 2005/0073532 A1 * | 4/2005 | Scott et al. ................... 345/634 |
| 2005/0192752 A1 | 9/2005 | Rooney et al. |
| 2005/0203671 A1 | 9/2005 | Mertins et al. |
| 2005/0209815 A1 | 9/2005 | Russon et al. |
| 2005/0223337 A1 | 10/2005 | Wheeler et al. |
| 2005/0225439 A1 | 10/2005 | Watanabe et al. |
| 2005/0273300 A1 | 12/2005 | Patwardhan et al. |
| 2006/0015374 A1 | 1/2006 | Ochs et al. |
| 2006/0061595 A1 | 3/2006 | Goede et al. |
| 2006/0095207 A1 | 5/2006 | Reid |
| 2006/0217105 A1 | 9/2006 | Kumar |
| 2006/0240814 A1 | 10/2006 | Cutler |
| 2007/0010924 A1 | 1/2007 | Otani et al. |
| 2007/0011982 A1 | 1/2007 | Swift |
| 2007/0025591 A1 | 2/2007 | Rhoads et al. |
| 2007/0076920 A1 | 4/2007 | Ofek |
| 2007/0115373 A1 | 5/2007 | Gallagher et al. |
| 2007/0131438 A1 | 6/2007 | Brandt et al. |
| 2008/0043020 A1 | 2/2008 | Snow et al. |
| 2008/0089558 A1 | 4/2008 | Vadon et al. |
| 2008/0125920 A1 | 5/2008 | Miles et al. |
| 2008/0191054 A1 | 8/2008 | Di Federico et al. |
| 2008/0258881 A1 | 10/2008 | Manson et al. |
| 2008/0258967 A1 | 10/2008 | Manson et al. |
| 2008/0261627 A1 | 10/2008 | Manson et al. |
| 2008/0262727 A1 | 10/2008 | Manson et al. |
| 2008/0262733 A1 | 10/2008 | Manson et al. |
| 2008/0262734 A1 | 10/2008 | Manson et al. |
| 2008/0263097 A1 | 10/2008 | Manson et al. |
| 2008/0263174 A1 | 10/2008 | Manson et al. |
| 2008/0284587 A1 | 11/2008 | Saigh et al. |
| 2009/0007697 A1 | 1/2009 | May |
| 2009/0105969 A1 | 4/2009 | Saylor |
| 2009/0132132 A1 | 5/2009 | Peterson et al. |
| 2009/0136788 A1 | 5/2009 | Koenig et al. |
| 2009/0293322 A1 | 12/2009 | Faivre et al. |
| 2010/0046842 A1 | 2/2010 | Conwell |
| 2010/0124378 A1 | 5/2010 | Das et al. |
| 2010/0223008 A1 | 9/2010 | Dunbabin et al. |
| 2010/0250136 A1 | 9/2010 | Chen |
| 2010/0274657 A1 | 10/2010 | Workman et al. |
| 2010/0277185 A1 | 11/2010 | Hughes |
| 2010/0306012 A1 | 12/2010 | Zyskowski et al. |

(56) References Cited

U.S. PATENT DOCUMENTS

| | | |
|---|---|---|
| 2011/0064312 A1 | 3/2011 | Janky et al. |
| 2011/0066397 A1 | 3/2011 | Kranz |
| 2011/0166705 A1 | 7/2011 | Anderson et al. |
| 2011/0181610 A1 | 7/2011 | Baggs et al. |
| 2011/0282578 A1* | 11/2011 | Miksa et al. .......... 701/208 |
| 2012/0255354 A1 | 10/2012 | Fu et al. |
| 2012/0327252 A1 | 12/2012 | Nichols et al. |

OTHER PUBLICATIONS

Luhmann, T. et al., "Close Range Photogrammetry", *Whittles Publishing, ISBN 0-470-10633-6*, (2006).

Gruen, Armin et al., "Algorithms for Automated Extraction of Man-Made Objects from Raster Image Data in a GIS", *Institute of Geodesy & Photogrammetry, Swiss Federal Institute of Technology*, 1 page.

"UpNext: 3D Local Search and Community.", www.upnext.com, (2009), "You City", www.youcity.com, (2009).

Agrios, Bronwyn et al., "Get in Touch with Volunteered Geographic Information", *ArcUser* www.esri.com, (Summer 2010),50-55.

Qtaishat, K. S., "Assessing the Performance of Different Direct-Georeferencing Strategies", *Institute of Engineering Surveying and Space Geodesy, University of Nottingham*, ASPRS 2006 Annual Congference, Reno, NV,(May 2006),9 pages.

Schwarz, Klaus-Peter "Aircraft Position and Attitude Determination by GPS and INS", *International Archives of Photogrammetry and Remote Sensing*, vol. XXXI, Part B6, Vienna., (1996),7 pages.

Mostafa, Mohamed M., "Digital Image Georeferencing From a Multiple Camera Source by GNS/INS", *ISPRS Journal of Photogrammetry and Remote Sensing*, vol. 56, Issue 1, (Jun. 2001),12 pages.

U.S. Appl. No. 13/023,411, Wuestefeld et al.

U.S. Appl. No. 12/902,013, Hamilton et al.

"PCT International Search Report and Written Opinion", PCT/US2012/061681, Apr. 22, 2013.

Saha, S. K., "Water and Wind Induced Soil Erosion Assessment and Monitoring Using Remote Sensing and GIS", Proceedings of a Training Workshop, Dehra Dun, India, Jul. 7-11, 2003, 315-330.

* cited by examiner

1000

```
CAPTURE A FIRST IMAGE, THE CAPTURED IMAGE COMPRISING A
FIELD OF VIEW INCLUDING AN OBJECT WITH AN IDENTIFIABLE
FEATURE
1010
```

```
PROVIDE THE FIRST IMAGE WITH THE IDENTIFIABLE
FEATURE TO AN IMAGE-BASED GEOREFERENCING SYSTEM
1020
```

```
RECEIVE FROM THE IMAGE-BASED GEOREFERENCING
SYSTEM AN AUGMENTED VERSION OF THE FIRST IMAGE
COMPRISING AUGMENTED LOCATION INFORMATION
REGARDING THE FIELD OF VIEW
1030
```

CAPTURE A FIRST IMAGE WITH A CAMERA, THE FIRST IMAGE
COMPRISING A FIELD OF VIEW INCLUDING AN OBJECT WITH AN
IDENTIFIABLE FEATURE
1110

PROVIDE THE FIRST IMAGE WITH THE IDENTIFIABLE
FEATURE TO AN IMAGE-BASED GEOREFERENCING SYSTEM
1120

RECEIVE FROM THE IMAGE-BASED GEOREFERENCING
SYSTEM A GEOREFERENCED LOCATION OF THE CAMERA
DURING CAPTURE OF THE FIRST IMAGE
1130

WITHIN AN IMAGE-BASED GEOREFERENCING SYSTEM, IDENTIFY A CATALOGED SECOND IMAGE THAT CORRELATES TO A FIRST IMAGE
1210

↓

DETERMINE A REFERENCE FEATURE COMMON TO BOTH THE SECOND IMAGE AND THE FIRST IMAGE
1220

↓

ACCESS GEOGRAPHIC INFORMATION RELATED TO THE COMMON REFERENCE FEATURE
1230

↓

PROVIDE THE GEOGRAPHIC INFORMATION REGARDING THE COMMON REFERENCE FEATURE FOR ACCESS BY A USER OF THE IMAGE-BASED GEOREFERENCING SYSTEM
1240

PROVIDE THE FIRST IMAGE TO AN IMAGE-BASED GEOREFERENCING SYSTEM, THE FIRST IMAGE INCLUDING AN IDENTIFIED POINT OF INTEREST ASSOCIATED WITH AN OBJECT IN THE SELECTED GEOGRAPHIC LOCATION
1610

↓

PROCESS THE FIRST IMAGE AT THE IMAGE-BASED GEOREFERENCING SYSTEM TO FIND AT LEAST ONE SECOND IMAGE CONTAINING A VIEW OF THE POINT OF INTEREST, WHEREIN THE SECOND IMAGE IS ASSOCIATED WITH A FIRST GEOREFERENCED COORDINATE SYSTEM
1620

↓

PROCESS THE FIRST IMAGE TO DETERMINE A GEOREFERENCED LOCATION OF THE POINT OF INTEREST IN THE FIRST GEOREFERENCED COORDINATE SYSTEM
1630

↓

PROVIDE THE GEOREFERENCED LOCATION OF THE POINT OF INTEREST FOR ACCESS BY A USER
1640

↓

STORE THE FIRST IMAGE ALONG WITH INFORMATION REGARDING THE GEOREFERENCED LOCATION OF THE POINT OF INTEREST IN A GEOREFERENCED IMAGES DATABASE FOR FUTURE USE BY THE IMAGE-BASED GEOREFERENCING SYSTEM
1650

RECEIVE AT LEAST ONE SET OF COORDINATES WHICH HAVE
BEEN MEASURED AT A POINT OF INTEREST
1910

DETERMINE A CORRECTION WHICH DESCRIBES A DIFFERENCE
BETWEEN THE AT LEAST ONE SET OF COORDINATES AND A SET
OF GEOREFERENCED COORDINATES FROM A GEOREFERENCED
IMAGE OF THE POINT OF INTEREST WHICH DESCRIBES THE
POSITION OF THE POINT OF INTEREST
1920

2100

USE A COMPUTER SYSTEM TO RECEIVE AT LEAST ONE SET OF COORDINATES WHICH HAVE BEEN MEASURED AT A POINT OF INTEREST
2110

USE THE COMPUTER SYSTEM TO DETERMINE A CORRECTION WHICH DESCRIBES A DIFFERENCE BETWEEN THE AT LEAST ONE SET OF COORDINATES AND A SET OF GEOREFERENCED COORDINATES WHICH DESCRIBE THE POSITION OF THE POINT OF INTEREST WITHIN A GEOREFERENCED IMAGE
2120

USE THE COMPUTER SYSTEM TO APPLY THE CORRECTION TO A SECOND SET OF COORDINATES OF THE GEOREFERENCED IMAGE TO DESCRIBE THE POSITION OF A SECOND POINT OF INTEREST
2130

FIG. 21

ACCURATE DIGITIZATION OF A GEOREFERENCED IMAGE

RELATED APPLICATIONS

The present application is a Continuation in Part of U.S. patent application Ser. No. 12/559,322, filed Sep. 14, 2009, entitled "Image-Based Georeferencing," by James M. Janky, Michael V. McCusker, Harold L. Longaker, and Peter G. France, assigned to the assignee of the present invention, and which is incorporated by reference in its entirety herein.

BACKGROUND

Modern techniques for locating one or more positions relative to objects of interest typically involve expensive instruments that are used for surveying, geographical information systems data collection, or geospatial data collection. Along with these position measurement instruments, a certain level of skill is typically required to properly operate the instruments such that valid positioning results are achieved. Optical survey instruments are well-known in the location measurement arts. Global Navigation Satellite System (GNSS) receivers are often used in conjunction with the surveying and geospatial instruments in order to speed position determination. Cameras have also been used for position determination via photogrammetry methods. The confluence of these systems produces a variety of data. Often, the georeferenced coordinates of an object will not describe the position of a point of interest with sufficient precision due to errors inherent in the process of creating the georeferenced images such as the limited resolution of the images, human errors from the process of identifying control points in the images, and using poor quality control coordinates.

BRIEF DESCRIPTION OF THE DRAWINGS

The accompanying drawings, which are incorporated in and form a part of this specification, illustrate various embodiments of the present invention and, together with the description of embodiments, serve to explain principles discussed below. The drawings referred to in this brief description of the drawings should not be understood as being drawn to scale unless specifically noted.

FIG. 10 is a flow diagram of an example method of obtaining geolocation information according to an embodiment.

FIG. 11 is a flow diagram of an example method of obtaining a georeferenced location, according to an embodiment.

FIG. 12 is a flow diagram of an example method of providing position information, according to an embodiment.

FIG. 16 is a flow diagram of an example method of determining the geographic location of a point of interest associated with an object in a first image at a selected geographic location, according to an embodiment.

FIG. 21 is a flow diagram of an example computer implemented method in accordance with an embodiment.

DESCRIPTION OF EMBODIMENTS

Figure 1:
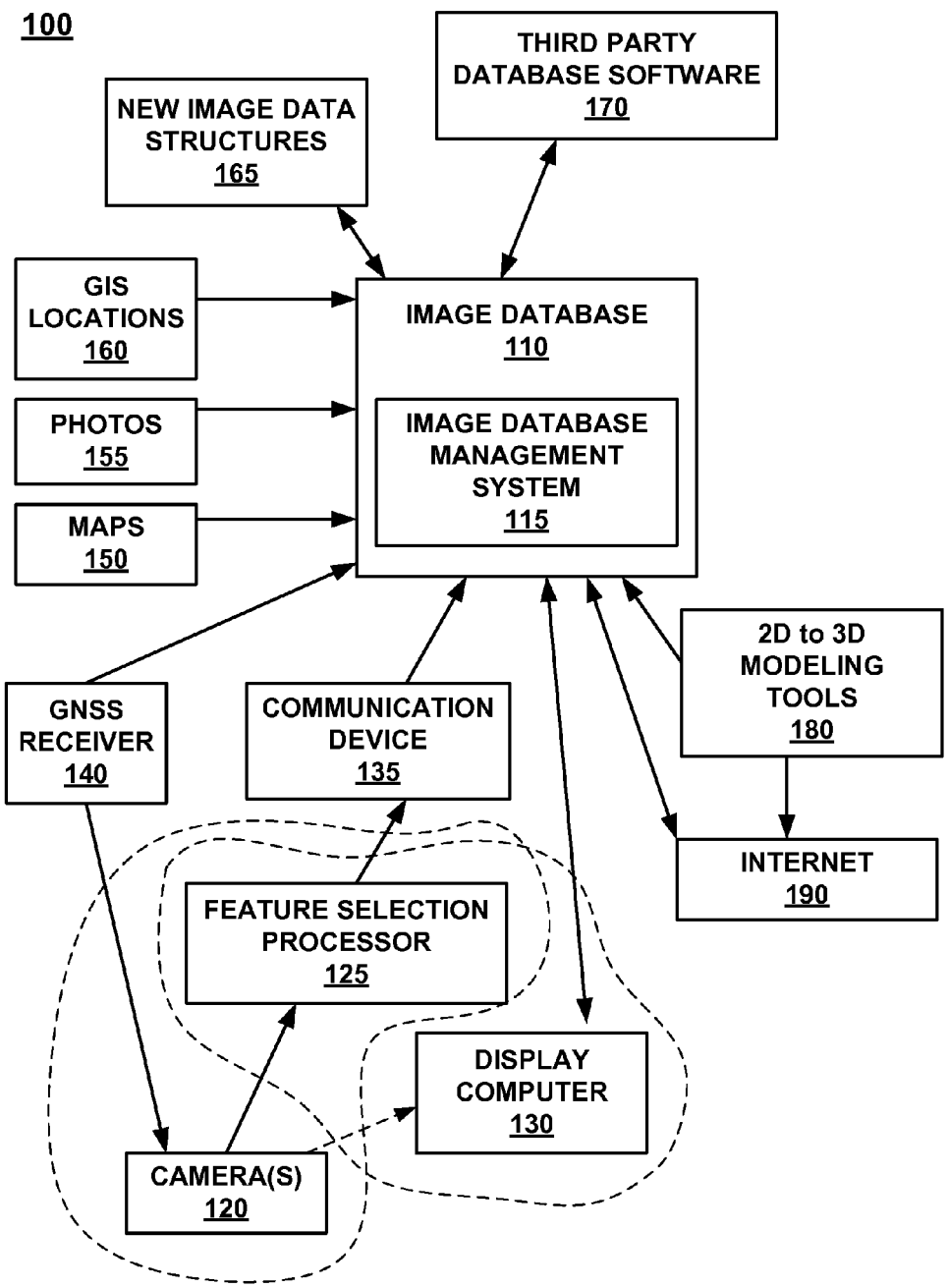
FIG. 1 is an example image-based georeferencing system, in accordance with an embodiment.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "replacing," "determining", "applying," "receiving," "comparing," "using," or the like, often refer to the actions and processes of an electronic computing device or system, such as an image-based georeferencing system, an image database, an image database management system, a digital camera, a video camera, a computer system, and/or a multimedia device, among others. "Georeferencing" generally means associating a location in a selected reference system with a particular point, either in space or on an object. There are several well-known such reference systems, including latitude, longitude, and elevation, as well as northing and easting from a particular reference point. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

There are two principal kinds of "views" described herein: elevation view and aerial view. Elevation view in its strict definition means an orthographic rectified representation of a structure, usually as viewed from ground level. Camera images/photographs not yet rectified for orthographic presentation and not strictly elevation views, but instead are referred to herein as 'façade views.'

Aerial views are images taken from above the objects of interest, often from airplanes or satellites, and themselves may be rectified or otherwise rendered to become orthographic. However, many image databases shown them without such rectification, thus often showing the elevation/façades of buildings in a foreshortened view. It is appreciated that an plan view such as from a blueprint or engineering drawing also falls into the category of aerial views as described herein.

In an image-based georeference system, finding a match between features on objects in a first image and corresponding features on the same objects in a second image must be done with some degree of confidence. Mathematically, the process used to effect this match is known as correlation. Herein, use of the word "correlated" means that two images of the same objects, as viewed from different viewpoints, contain common features or points. Correlation is the process employed to determine if two images are correlated. The mathematics associated with image correlation methods are well-known in the image-processing arts.

Overview of Discussion

Herein, an image-based georeferencing system is described that includes a database of georeferenced images and a specialized image database management system for processing selected/received images to geolocate and augment/annotate points within the received/selected images via comparison and correlation with existing georeferenced image information (e.g., from the image database). In this manner, embodiments described herein provide geospatial and geographic information system (GIS) and survey users access to precise geolocation of a large number of features/points of interest that can be identified in images. Such quantified features also open a variety of geolocation information to other "amateur" users such as tourists, hikers, automobile drivers, geocachers, and the like. Such features allow users/customers of an image-based georeferencing system to use a suitable camera to take a photograph and then use the image-based georeferencing system and the contents of the photograph to make precise measurements of geolocations of features of interest in the photograph. This geolocation information can be used in a variety of projects that in the past required more specialized and more expensive measurement equipment.

There is a professional need for the geospatial information which can be provided by the system and methods described herein. For example, image databases, such as overhead or aerial image databases that include predominantly or exclusively two-dimensional location data (e.g., latitude and longitude type data) can be readily supplemented with a third, Z-dimension, of height or altitude data associated with points of interest of the represented image content via the techniques, methods, and systems disclosed herein. Many features of GIS databases can likewise be supplemented with additional geospatial information via the techniques, methods, and systems disclosed herein. Adding a reliable Z-dimension to such databases means that the predominantly two-dimensional world of GIS practitioners can make a transition to the three-dimensional world of geospatial information science where objects are located in three-dimensional space.

Discussion will begin with a description of an example block diagram of an image-based georeferencing system including an image database and an image database management system. More detailed discussion will focus on the components of the image database management system and on several example cameras which may be utilized with embodiments described herein. A series of images will be described to illustrate concepts of image-based georeferencing and close-range photogrammetry. Operation of the example image-based georeferencing system and various components thereof will be further described in conjunction with discussion several example methods of operation. Discussion will then move to description of an example computer system with which or upon which various embodiments of the present invention can be implemented. Finally, a method and system for implementing accurate digitization from a georeferenced image in accordance with various embodiments will be discussed.

Image-based Georeferencing System

FIG. 1 is an example image-based georeferencing system 100, in accordance with an embodiment. As shown in FIG. 1, image-based georeferencing system 100 includes an image database 110 and an image database management system 115. In various embodiments, system 100 is communicatively coupled with one or more of: a camera 120, a feature selection processor 125, a display computer 130, a Global Navigation Satellite System (GNSS) receiver 140, maps 150, photos 155, Geographic Information System (GIS) locations 160, new image data structure(s) 165, third party database software 170, 2D-3D modeling tools 180, and the Internet 190.

Image database 110 comprises a database of georeferenced images of terrestrial scenes. The images of image database 110 include one or more features within each image that are geolocated to a coordinate system, such as a county GIS grid; World Geodetic System (WGS)-84; a latitude, longitude (and elevation); and the like. The images included in image database 110 include panoramic images; orthophotos (e.g., plan view type aerial and satellite images); façade or street view images (e.g., elevation type images); raster images; models and/or blueprints (e.g., Computer Aided Drafting/Engineering files), among others. Image database 110 also includes georeferenced data, vector data, and attributes that is/are associated with database images. The images are searchable by criteria such as image features, image attributes, camera location, and/or image location, among other search criteria.

Image database management system 115 operates to access, manage, and maintain image database 110. Image database management system 115 receives inputs, queries, and the like to image database 110, processes received/selected images, and provides output and/or access to results of queries, processed images, and the like. Part of this management includes communicating with outside resources such as map repositories (e.g., maps 150); images to be processed (e.g., photos 155); georeferenced terrestrial image repositories/services such as Google Earth™ (by Google®), Virtual Earth™ (by Microsoft®), TerraServer® (by TerraServer®), and the like (e.g., new image data structures 165); and government and commercial GIS information repositories (e.g., GIS locations 160). Georeference data points that encompass GIS locations 160 can be obtained from many sources to include: United States Geological Survey's (USGS) survey reference points and georeferenced images; selected reference points from city public works databases; and Continuously Operating Reference Stations (CORS). These CORS reference points are managed by the US Government under the National Geodetic Survey agency in the National Oceanographic and Atmospheric Administration, using GNSS receivers working with data from the GPS and GLONASS constellations.

Another part of this management includes accessing or allowing access of third party database software 170 which can assist in searching, organizing, or processing image information of image database. Yet another part of this management includes accessing or allowing access to two-dimensional and three-dimensional modeling tools 180 (e.g., software for rectifying images such as RolleiMetric MSR, software for photogrammetric multi-image evaluation such as RolleiMetric CDW, and other digital image manipulation and/or modeling software which may be available via communicative coupling to the Internet).

It is appreciated that, in various embodiments, image database management system 115 may reside at a data center or service facility run by an entity such as a company. In one such embodiment, a user remotely accesses database management system 115 or submits information and/or queries to an interface of image database management system 115. In another embodiment, image database management system 115 may be resident all or in part on a user's computer system (e.g., a personal computer, desktop computer, multi-media device, or the like), thus allowing a user to access image database 110. In one such embodiment, a user's computer system may comprise a thin-client architecture allowing access to functions of image database management system 115 and image database 110 which are maintained elsewhere, such as in a datacenter.

Feature selection processor 125 is a device and/or utility that allows a user to select or annotate a feature in a terrestrial image for which the user desires geolocation information. In one embodiment, annotating a feature in this manner, triggers system 100 to search for geolocation information to describe the annotated feature. In one embodiment, feature selection processor 125 is implemented using a display screen of a digital camera 120 to select, for example, a corner of a building in an image captured by camera 120. In one embodiment, feature selection processor 125 is implemented using a display computer 130 to select, for example, a corner of a building in an image captured by camera 120 or in an image stored in storage such as on a hard disk drive of display computer 130. In one embodiment, an image and the selected feature thereof, are communicated via communication device 135 (e.g., a wired or wireless communication device such as a wired/wireless modem/network interface and/or a cellular telephone) or via communicative coupling (similarly wired or wireless) from display computer 130 to image-based georeferencing system 100 for use in georeferencing or geolocation. It is appreciated that the communicated image may include geolocation information, provided by the user (e.g., a street address, zip code, latitude/longitude, or the like) or geolocation information that has been manually or automatically associated with the image via contemporaneous input from GNSS receiver 140 during capture of the image.

It is appreciated that, in one embodiment, geolocation information may be input automatically during capture of the image and may be stored or appended as part of the image file. Such geolocation information can include the location of camera 120 at time of image capture; date/time of image capture; the source of the geolocation information; an expected level of accuracy of the geolocation information (e.g., number of GNSS satellites in view, type of augmentation used with satellite information, and the like). This georeferenced information can come from a number of sources, including: GNSS receiver 140; Wireless Fidelity (WiFi) signals; GNSS augmentation signals (e.g. WAAS); and/or cellular towers, among others. In one embodiment, such geolocation information is included as a tag associated with the digital file of the image or included in the image file itself, such as in the header of the image file. In one embodiment, all or part of the geolocation information is included in EXIF (exchangeable image file format) location metadata tag of the digital image file of the image.

GNSS receiver 140 is a navigation system that makes use of a constellation of satellites orbiting the earth which provide signals to a receiver that estimates its position relative to the surface of the earth from those signals. Some examples of such satellite systems include the NAVSTAR Global Positioning System (GPS) deployed and maintained by the United States, the GLObal NAvigation Satellite System (GLONASS) deployed by the Soviet Union and maintained by the Russian Federation, and the GALILEO system currently being developed by the European Union (EU), and the Compass system of China. A GNSS receiver 140 may utilize signals from one or more satellite systems and may also utilize signals from other sources. It is appreciated that various enhancements to a GNSS receiver 140 may be employed to increase the positional accuracy of its position determinations. Some examples of enhancements include the Wide Area Augmentation System (WAAS), differential GPS (DGPS) and the like; and Real Time Kinematics (RTK).

It is appreciated that GNSS receivers, such as GNSS receiver 140, are utilized in a variety of applications besides their uses in surveying. As such, GNSS receivers 140 have become less inexpensive over time and fairly ubiquitous in modern society. Cameras 120, and in particular digital cameras, both still and video, are also fairly pervasive in modern society. It is appreciated that digital cameras 120 exist as stand alone devices and are also bundled into a wide variety of multimedia devices and/or mobile communication devices such as mobile telephones, computers, and personal digital assistants. Additionally, some electronic devices bundle together GNSS receivers 140 along with digital cameras 120 and/or other electronic components.

Image Database Management System

Figure 2:
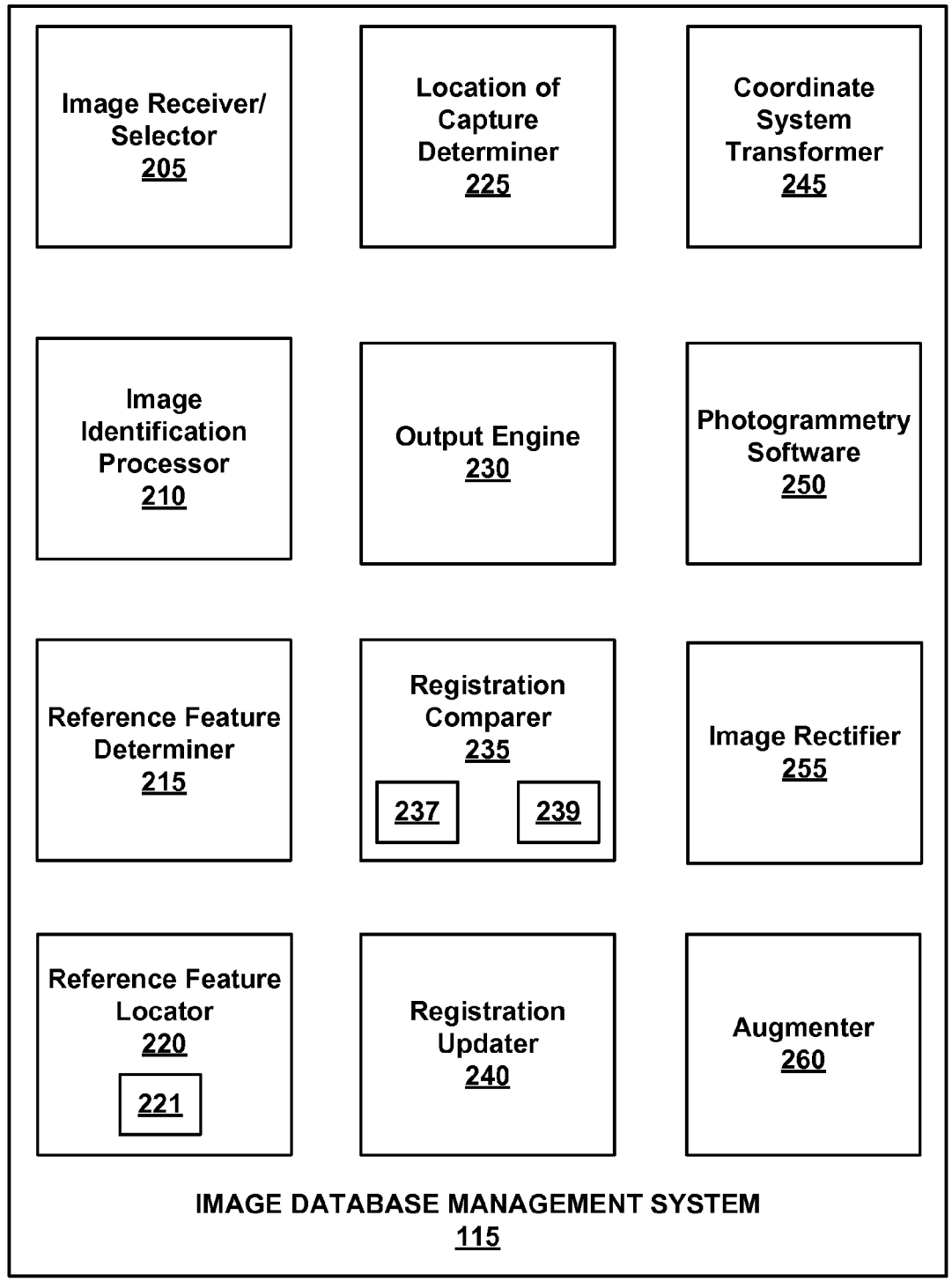
FIG. 2 is an example block diagram of an image database management system, in accordance with an embodiment.

FIG. 2 is an example block diagram of an image database management system 115, in accordance with an embodiment.

As depicted, image database management system includes one or more of: image receiver/selector 205, image identification processor 210, reference feature determiner 215, feature locator 220, location of capture determiner 225, output engine 230, registration comparer 235, registration updater 240, coordinate system transformer 245, photogrammetry software 250, image rectifier 255, and augmenter 260. These components may be implemented in one or more of hardware, hardware and firmware, and hardware and software. As depicted in FIG. 1, image database management system 115 is, in one embodiment, a part of image database 110. In other embodiments image database management system 115 is a separate entity from image database 110 and is communicatively coupled with image database 110.

Image receiver/selector 205 operates to receive an image for processing/use in georeferencing (when sent from a remote user) or to allow a local user of image database management system 115 to select an image for processing/use in georeferencing, such as from photos 155 or another storage location. It is appreciated that the received/selected image is a digital file, which can include an image file captured by a digital camera or a digital scan of an analog (i.e., film-based) image.

Image identification processor 210, in one embodiment, operates to identify an image from image database 110 that correlates to the received/selected image being processed for georeferencing. Image identification processor 210 can identify the image from image database 110 based on location information, feature matching/image recognition, or other search criteria. For example, the identified image from image database 110 is, in one embodiment, an aerial image that encompasses or corresponds to a geolocation tagged in an image file of the received/selected image. In an embodiment where the received/selected image includes a user annotated point for which georeferenced information is desired, image identification processor 210 identifies an image that contains the annotated point from image database 110. In one embodiment, the annotated point is annotated (such as by circling, tagging, or the like) by the user via feature selection processor 125. It is appreciated that image identification processor 210 may be implemented as hardware, or a combination of hardware and firmware, or a combination of hardware and software such as an image recognition algorithm.

Reference feature determiner 215, in one embodiment, operates to determine a reference feature common to both the received/selected image and the image identified from image database 110. It is appreciated that a plurality of common reference features may also be determined. Pattern matching, corner detection, and other automated image correlating or matching techniques may be used to perform automated matches of reference features such as, for example, a building corner, that is common to both images. Alternatively, this matching can be done by the user, in one embodiment. In one embodiment, the reference feature is a feature that includes location data that is associated with the image identified from image database 110. Thus, for example, a matched building corner may be a surveyed, georeferenced location in the identified image from image database 110.

In an embodiment, where the reference feature is not already georeferenced in the identified image, feature locator 220 accesses a GIS to identify and obtain geographic location information related to the common reference feature. For example, this can be accomplished by accessing a surveyed map, a county or city GIS database, aerial database, a blueprint of a building, or the like. As the reference feature(s) is/are georeferenced, they serve as reference points for feature locator 220 to use in locating additional features in a field of view of the received/selected image. As will be described herein, the additional features in the received/selected image can be located by feature locator 220 via means such as interpolation, scaling, photogrammetry, triangulation and the like. In one embodiment a user-annotated point of interest/object of interest/feature of interest is located in this manner. It is appreciated that via augmenter 260, the location point of a located feature can then be annotated on the received/selected image or otherwise augmented/associated with an annotated point in the received/selected image.

In one embodiment, feature locator 220 employs an accuracy validator 221 to check for and validate a level of accuracy associated with geographic location information accessed by feature locator 220. This provides a check of the inherent accuracy of the georeferenced position fix that feature locator 220 has retrieved for a determined reference feature. Accuracy validation can include validating the presence of vertical information in the georeferenced position fix. Such vertical information is referred to herein as Z-coordinate information.

In one embodiment, accuracy validation is accomplished to validate whether or not the accuracy of the positioning associated with the received/selected image may already be higher than the accuracy of georeferenced information that is otherwise obtainable from image database 110 or data sources communicatively coupled thereto. In one embodiment, accuracy validator 221 looks for an accuracy metric associated with the surveyed map, a county or city GIS database, aerial database, a blueprint of a building, or the like from which feature locator 220 retrieved the georeferenced position fix. If an accuracy metric is found, in one embodiment accuracy validator 221 notes the accuracy metric in a file associated with the selected/received image. In one embodiment, in absence of a metric, accuracy validator 221 attributes a validated accuracy to a georeferenced position fix based upon a known source of the position fix.

In one embodiment, for example, accuracy validator 221 validates a GPS RTK sourced position fix to have an accuracy of better than 5 cm, as GPS RTK measurements are typically accurate to 0.1-5 cm; validates a PPP (precise point positioning) sourced position fix to have an accuracy in the 5-10 cm range; validates a High-Precision GIS sourced position fix to have an accuracy in the 10-30 cm range; validates a Differentially Corrected GPS sourced position fix to have an accuracy in the 30 cm to 4 m range; and validates an uncorrected GPS-sourced position fix to have an accuracy in the 4-7 m range.

In one embodiment, accuracy validation is accomplished to ensure that enough georeferenced information of accurate enough character is available for performing georeferencing of other points. For example, in one embodiment, if no Z-coordinate information is available from image database 110, this may trigger feature locator 220 to cause output engine 230 to send a real-time request to the supplier of a received image.

In one embodiment, such a real-time message advises the image supplier to capture and supply another image from a different location of capture (for use in triangulation) or else to supply any available Z-coordinate information related to the received image or the location of capture of the received image. If this real-time message is received in a timely fashion, it can save an image supplier another trip to the field for additional data collection. In one embodiment, the absence or presence of information related to any validated accuracy of vertical, Z-coordinate information is provided to Z-coordinate accuracy estimator 239. This can be the absence or presence of vertical, Z-coordinate information related to the received/selected image. This can also be the absence or presence of vertical, Z-coordinate information related to a reference feature. This can also be the absence or presence of Z-coordinate information related to an image from image database 110.

Location of capture determiner 225, in one embodiment, operates to determine or refine a location of capture of the received/selected image. For example, by using geographic location information related to a common feature(s) between the identified image and the received/selected image is used to determine a georeferenced location of capture of the received/selected image. This is accomplished, in one embodiment, through triangulation. For example, in one embodiment, a previously unknown point in or relative to the selected/received image (e.g., the location of capture) can be triangulated from at least three non-collinear geolocated points from at least three respective reference features identified in the received/selected image.

In another embodiment, when a GNSS receiver 140 is utilized in conjunction with the capture of a received/selected image, the GNSS receiver denotes the location of capture of a received/selected image. In such an embodiment, location of capture determiner 225 uses a GNSS position relative to a camera 120 used for capturing the received/selected image to determine a location of capture of the received/selected image. The GNSS position relative to camera 120 can be utilized alone to determine the location of capture of the received/selected image. The GNSS position relative to camera 120 can also be used in conjunction with other more accurate georeferenced information (e.g., accessed from image database 110) to further refine the GNSS determined location of capture of the received/selected image.

In yet another embodiment, a camera 120 that is used to capture the received image is positioned such that its image plane is along the gravity vector above a surveyed mark and georeferenced information regarding the surveyed mark and height of camera above the surveyed mark are included with the selected/received image. Location of capture determiner 225 can use this georeferenced information alone to determine the location of capture of the received/selected image, or can use this georeferenced information in conjunction with other more accurate georeferenced information (e.g., accessed from image database 110) to further refine the survey determined location of capture of the received/selected image. In one embodiment, accuracy validator 221 determines the accuracy of georeferenced information, such as location of capture, that is supplied with a received/selected image to determine whether more accurate geolocation information exists that can be used to further refine the supplied location of capture.

Output engine 230, in one embodiment, provides georeferenced information derived and identified from the received/selected image as an output accessible by a user of system 100. Among other output actions, this can include electronically transmitting an augmented georeferenced version of the received/selected image back to the user, or to a location specified by the user (e.g., display computer 130), storing the georeferenced version of the received/selected image in image database 110 for future use by system 100, and/or allowing user access to a stored copy of the georeferenced image received/selected image. Through these and other mechanisms, output engine 230 pushes information to a user or to user selected location or makes such information available for user pull (such as download).

Registration comparer 235, in one embodiment, compares georeferenced registration information that is received in conjunction with a received/selected image to existing georeferenced registration information that is associated with an identified image to determine which is more accurate. In one embodiment, the level of accuracy is determined based upon comparing accuracy of sources used for determining the georeferenced information of the images being compared.

In one embodiment, registration comparer 235 includes a provenance checker 237 to determine a provenance of accuracy for a georeferenced position fix. The provenance of accuracy includes information such as the source of the georeferenced position fix and the level of accuracy associated with the source. Some examples of sources for a georeferenced position fix include, but are not limited to: GPS alone, GPS supplemented with WAAS, differential GPS, GPS-RTK, Google Earth™, TerraView; or surveyed coordinates. Provenance checker 237 can ascertain the source of a position fix from metadata, when available, that is associated with an image or a position fix. Similarly, accuracy information associated with the position fix source may also be included with the metadata associated with an image or a position fix (e.g., how many GPS satellites were in view and being used when a position fix was taken, expected centimeters of accuracy of a position fix, whether/what type of enhancement/augmentation was utilized with GNSS signals, and the like).

When accuracy data is not included with a position fix or an image, and/or cannot be determined by provenance checker 237, then registration comparer 235, in one embodiment, determines accuracy of a position fix through use of a lookup-type table or list that assigns default accuracies to position fix sources and/or establishes a hierarchy of accuracy from best to least for different types of position fix sources. Consider, as an example, a hierarchy of sources that specifies that GPS-RTK source information has a more accurate registration than Google Earth™ source information. In one embodiment, for example, a received image has registration information and position fixes that were determined using GPS-RTK. In a present day implementation, an image with such registration information and position fixes will be determined to be more accurate than an identified image that derived its registration information from Google Earth™, as GPS-RTK presently has more accurate position fixing than Google Earth™, which is sometimes off in registration by up to several meters. A hierarchical ranking or attributed accuracy may be altered over time. For example, as registration accuracy of Google Earth™ improves or degrades, its ranking in a hierarchy can be increased and decreased relative to other types of position fix sources, as is appropriate.

In one embodiment, registration comparer 235 includes a Z-coordinate accuracy estimator 239 to determine the accuracy of a vertical, Z-coordinate of a position fix associated with a point or reference feature in an image. It is appreciated that some images, such as aerial images, may not have any Z-coordinate or height associated with points, and thus do not have any Z-accuracy metric. A comparison of estimated Z-accuracies of like features in a pair of images can be used to determine which has better accuracy and which should be used for registration information in image database 110. It is appreciated that Z-coordinate accuracy estimator 239, in various embodiments, operates in conjunction with feature locator 220, accuracy validator 221, and/or location of capture determiner 225 to collect Z-coordinate information and accuracy information related thereto. In various embodiments, this can comprise z-coordinate accuracy estimator 239 collecting such information for a received/selected image or for a georeferenced position fix information accessed from image database 110 or a resource communicatively coupled thereto.

In one embodiment, for example, a candidate image is selected by or received by image selector/receiver 205. After image identification processor 210 identifies a second image that matches or correlates to the candidate image, and after reference feature determiner 215 determines objects/buildings and/or other reference feature(s) common to the candidate and identified image, feature locator 220 locates and retrieves geographic location information related to the common reference feature (e.g., a building corner). Registration comparer 235 looks for a position fix, like a latitude and longitude (and elevation), either in the aerial view, or elsewhere. In many cases, such a position fix has already been located by feature locator 220 and the accuracy of this position fix has already been vetted by accuracy validator 221.

Registration comparer 235 then compares a camera/GNSS location of capture accuracy (assuming availability) with the accuracy of a triangulated location of capture that has been determined by triangulating at least three non-collinear points accessed from image database 110, or a resource communicatively coupled thereto. Registration comparer 235 decides if the camera/GNSS position fix for the location of capture is more or less accurate than the triangulated fix. If so, registration updater 240 is employed to update any position fixes in the received/selected image by shifting the less accurate coordinates by a value that compensates for the difference between the less accurate and more accurate position. Registration updater 240 next checks to see if there are any other points in the field of view of the received/selected image that have better accuracy of position fix than the accuracy available for like points via access of image database 110 or resources communicatively coupled thereto. When a comparison determines that greater accuracy is available for a position fix of a point, information in image database 110 is updated by registration updater 240 in a similar manner by shifting the less accurate coordinates by a value that compensates for the difference between the less accurate and more accurate position.

When more than one new point is obtained during the course of gathering data with a camera and another method with defined accuracy judged or determined better than what is available from the image-based georeferenced data, an alternate adjustment can be made to the data in the database by registration comparer 235. The general approach to making such an adjustment is often done via the method of least squares. With multiple new control data points, the method is referred to as 'multiple regression least squares.' These techniques are well-known in the optimization arts. By one or more of these techniques, the adjustment to the original data points is made via a curve fitting process whereby the error differences between the new high accuracy data points and the points under adjustment are minimized, over the ensemble of all adjusted points. Weighting of the reference data points can enhance the value of the contribution of higher-accuracy newly-found points. Registration updater 240 (described below), then updates image database 110 with the adjusted data.

Registration updater 240, in one embodiment, updates existing geo-registration information with georeferenced registration information from a received/selected image if registration comparer 235 has determined that the geo-registration information for the received/selected image is more accurate than the geo-registration information for identified image. In one embodiment, when a GNSS/camera location of capture includes a Z-coordinate, when none is otherwise available, this Z-coordinate can be promulgated to other X-Y only position fixes by scaling, close range photogrammetry, or other methods described herein. In this manner, Z-coordinate information can be added to X-Y coordinate information for a feature (e.g., a building corner) available from an aerial view (e.g., an image from Google Earth™). It is also appreciated that if a more accurate Z-coordinate is available from a received/selected image, existing Z-coordinates from image database 110 can be adjusted to reflect improved Z-accuracy. In these manners, georeferenced content of image database 110 is refined when more accurate registration information becomes available.

Coordinate system transformer 245 operates, in one embodiment, to transform GIS information related to one or more common reference features or identified features into a desired coordinate system. This can be a local coordinate system, a coordinate system specified by a user, or a widely used coordinate system such as a global navigation satellite system coordinate system (e.g., WGS-84, North American Datum 1984, or the like). Techniques for transforming coordinates from one coordinate system to another are well-known in the art.

Photogrammetry software 250, in one embodiment, comprises resident software in image database management system 115 or software accessible by image database management system 115. Photogrammetry software is used, in one embodiment, for camera calibration (i.e., precise determination of focal length, field of view, image principal point, optical axis, as well as the ability to correct for optical distortions) of a camera 120 used in capturing a received/selected image. In other embodiments, photogrammetry software is used to adjust image perspective (i.e., to rectify an image) and/or to assist in geolocating items in the fields of view of at least two images. Several photogrammetry software suites are available commercially, e.g., PhotoModeler, iWitness, Topcon's ImageMaster, RolleiMetric's CDW and CDW Graphics and may, by way of example and not of limitation, be utilized as photogrammetry software 250.

Image rectifier 255 "rectifies" or adjusts the perspective of non-perpendicular images to provide precise vertical and horizontal reference features. Image rectifier 255 has the ability to rectify a flat, or nearly flat, region in the image, for example a building façade. This rectification is typically performed by rotating the image content about a vertical axis until lines such as the top edges of buildings, doors, and windows, become perpendicular to the vertical axis in the portion of the image of interest, such as a vertical building edge. It is appreciated that techniques for such rectification are well known in the fields of digital image manipulation. Photorectification can be done for horizontal surfaces, such as a street, by the same methods. In accordance with embodiments of the present invention, image rectification can be executed so that the vertical and horizontal scales are the same such that features in a rectified imaged can be geolocated by scaling from known distances between common points that are supplied from a georeferenced image identified from image database 110.

Augmenter 260 augments location information on or in association with the received/selected image. This location information can include geographic location information regarding common reference information between the received/selected image and the identified image. In this manner a georeferenced image is created from the received/selected image. The annotated georeferenced image, annotated metadata tags, or associated annotation file can then be stored in image database 110 or other storage, and/or output to a user or provided for user access. In an embodiment where augmenter 260 marks up the received/selected image, annotation marks are indicative of identified reference points and other identified features. The annotation marks, when made, may comprise information such as coordinates of a coordinate system being placed in or associated with points in the georeferenced image. It is appreciated that the annotations may be made in a coordinate system that to which the identified image is georeferenced. Likewise, the annotations may be made in another coordinate system (such as a coordinate system requested by a user) by using coordinate system transformer 245 to transform coordinates to a desired coordinate system prior to making annotations.

Figure 3A:
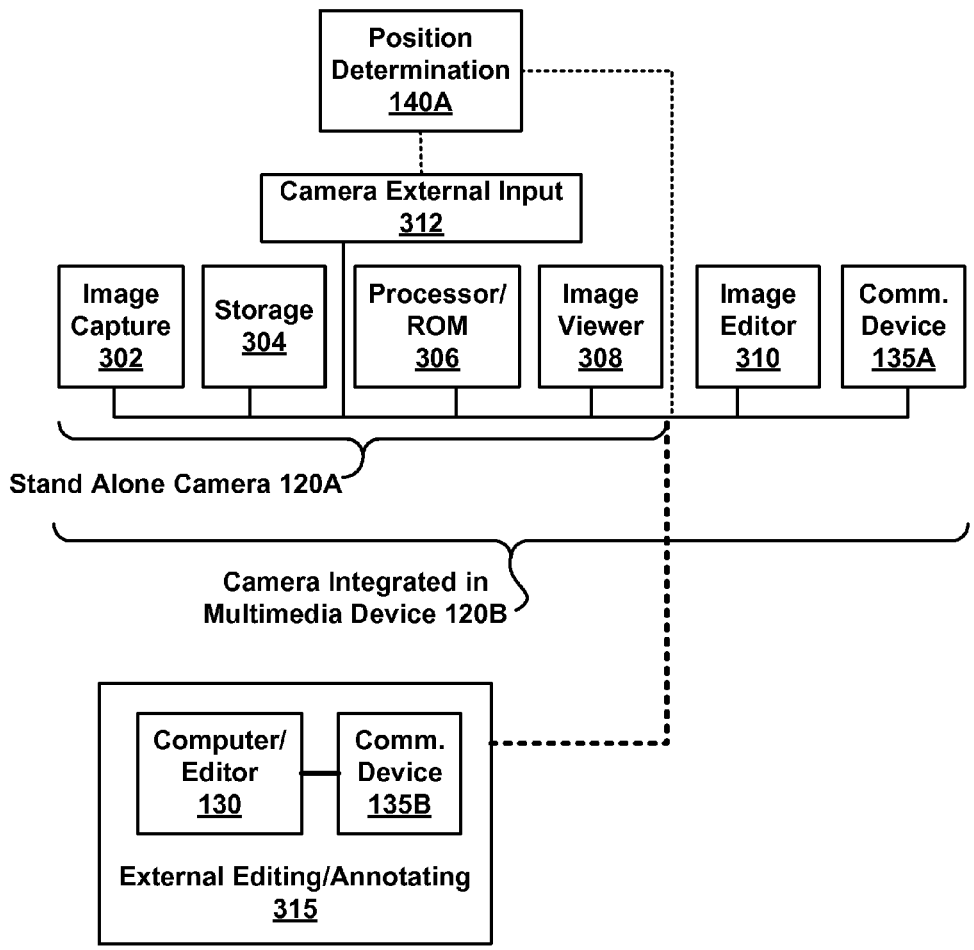
FIG. 3A is an example block diagram of a digital camera, in accordance with various embodiments.

FIG. 3A is an example block diagram of a digital camera 120, in accordance with various embodiments. As illustrated in FIG. 3A, in one embodiment, a stand alone camera 120A includes components 302 for image capture (e.g., a lens and image sensor), storage 304 (e.g., random access memory); processor and read only memory 306; image viewer 308 (e.g., a liquid crystal display); and external input 312 (e.g., a serial or other bus). As illustrated, in one embodiment a position determination component 140A (e.g., a GNSS receiver/antenna) is coupled to the camera external input 312 of a stand alone camera 120A and/or multimedia device 120B, provided as an integrated component of a stand alone camera 120A, and/or integrated along with the camera in a multimedia device 120B. In one embodiment, an image editor 310 and a communication device 135A (e.g. a wired/wireless modem or network interface) is/are built in to a multimedia device 120B that includes a digital camera. An example of a camera included in a multimedia device 120B includes a cellular phone or personal digital assistant that includes a digital camera. In one embodiment, external image editing/annotating 315 is available, such as on display computer 130 which is communicatively coupled with camera 120A/120B via a wired or wireless communication device 135B.

For high geolocation accuracy, a suggested camera is an advanced amateur system with high resolution with 6 to 24 or more megapixels, preferably with fixed focus. The camera/lens system should be mechanically rigid under reasonable environmental conditions and handling conditions. In one embodiment, the camera will have a port to receive precise GPS location information and record this in EXIF registers, but this is not required. Specialized higher-end, more accurate cameras than these can be used, or a very simple portable digital camera such as a cellular phone camera will be useful as well.

Figure 3B:
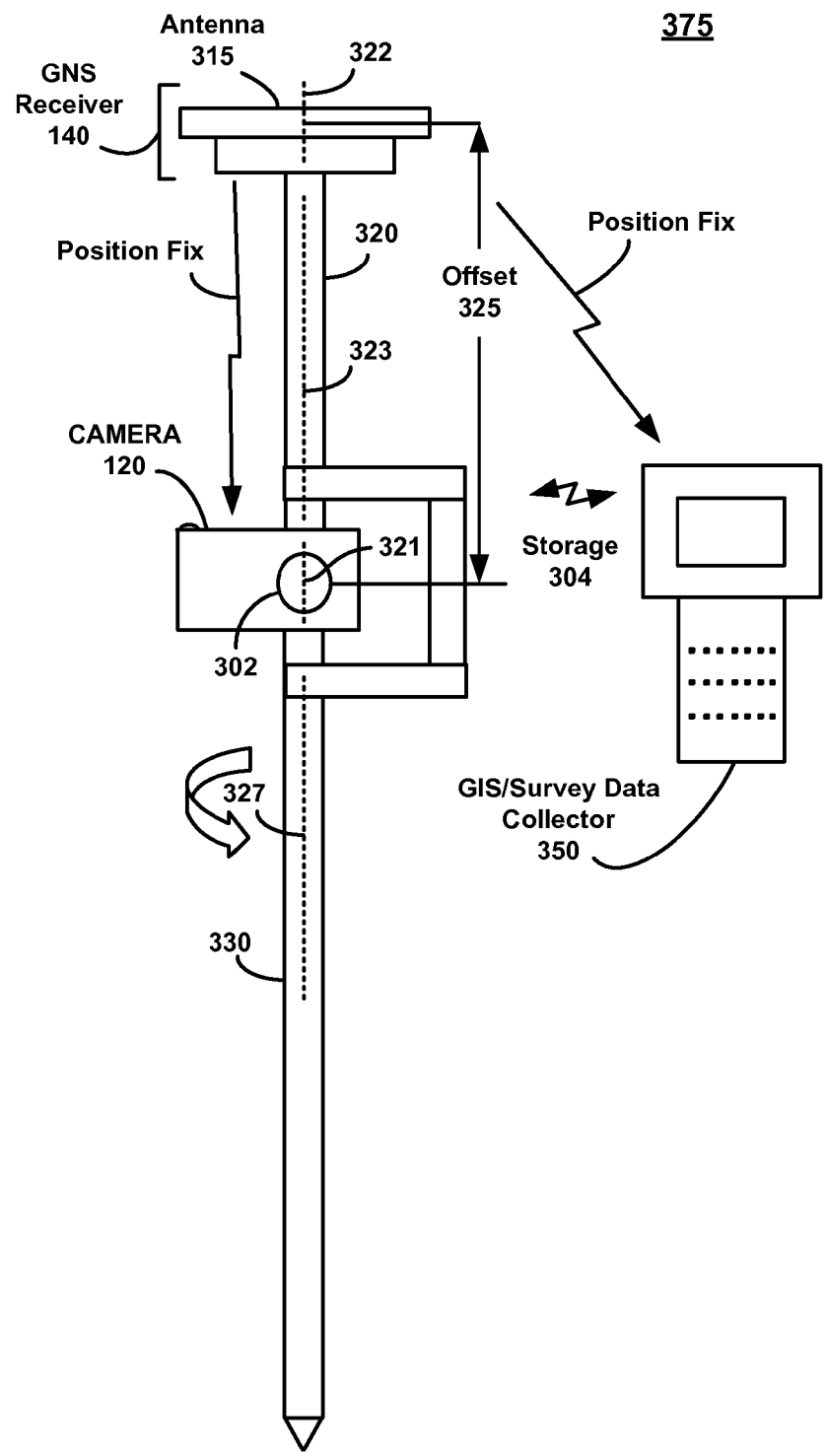
FIG. 3B is an example camera/GNSS receiver alignment system, in accordance with an embodiment.

FIG. 3B is an example camera/GNSS receiver alignment system 375, in accordance with an embodiment. Alignment system 375 comprises a digital camera 120 with a lens/imaging sensor 302. A GNSS receiver 140 includes an antenna 315. Both are coupled to camera 120 via a support pole 320. The offset 325 of support pole 320 is known and is figured into calculation of the location of camera 120. Axis 321 goes thru the entrance aperture point of lens/imaging sensor 302, parallel to the image plane of camera 120. The rotational axis 323 of support pole 320 is aligned with the centerline of the phase center 322 of antenna 315 of GNSS receiver 140. It is appreciated that axis 321, associated with the entrance aperture (the point where all the light rays cross) of camera 120, is adjusted so that it is aligned with the rotational axis 323 of pole 320 and with phase center 322 of antenna 315. In one embodiment, an additional mounting pole 330 may also be coupled to camera 120 to steady camera 120 above a surface, such as the ground, while capturing images. As illustrated, the rotational axis 327 of mounting pole 330 is also aligned with axis 321, axis 323, and phase center 322. It is appreciated that location information, such as position fixes, captured by GNSS receiver 140 contemporaneously with the capture of images by camera 120 may be stored in/with the image files of the images, such as in an EXIF metadata tag. It is also appreciated that location information captured from GNSS receiver 140 contemporaneously with the capture of images by camera 120 may be additionally or alternatively be communicatively coupled to another location, such as a GIS/survey data collector 350 and stored therein.

Figure 4A:
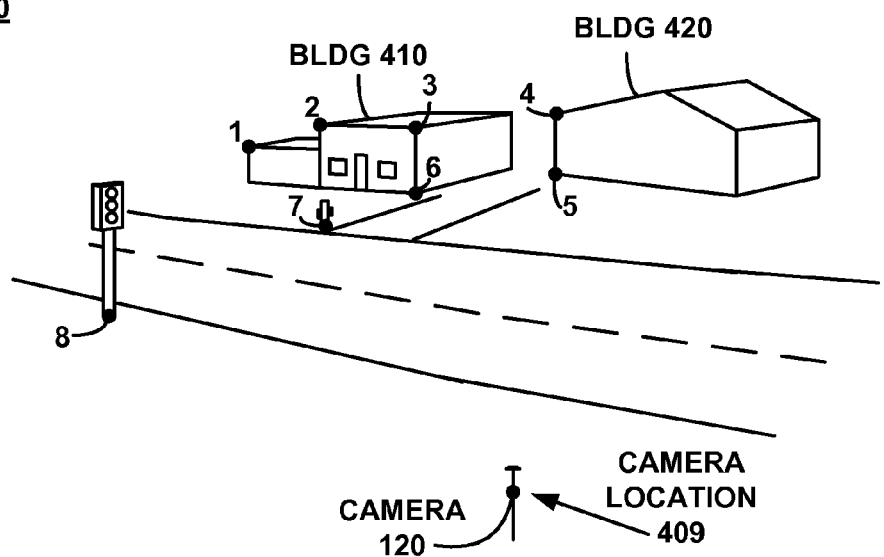
FIG. 4A is perspective view of a terrestrial scene, according to an embodiment.

FIG. 4A is perspective view 400 of a terrestrial scene, according to an embodiment. Perspective view 400 includes a building 410, a building 420 and several points of interest (1-8) that have been annotated for purpose of example. Camera location 409 denoted a location of camera 120 at the time of capture of image 405 (FIG. 4B, 4C).

Figure 4B:
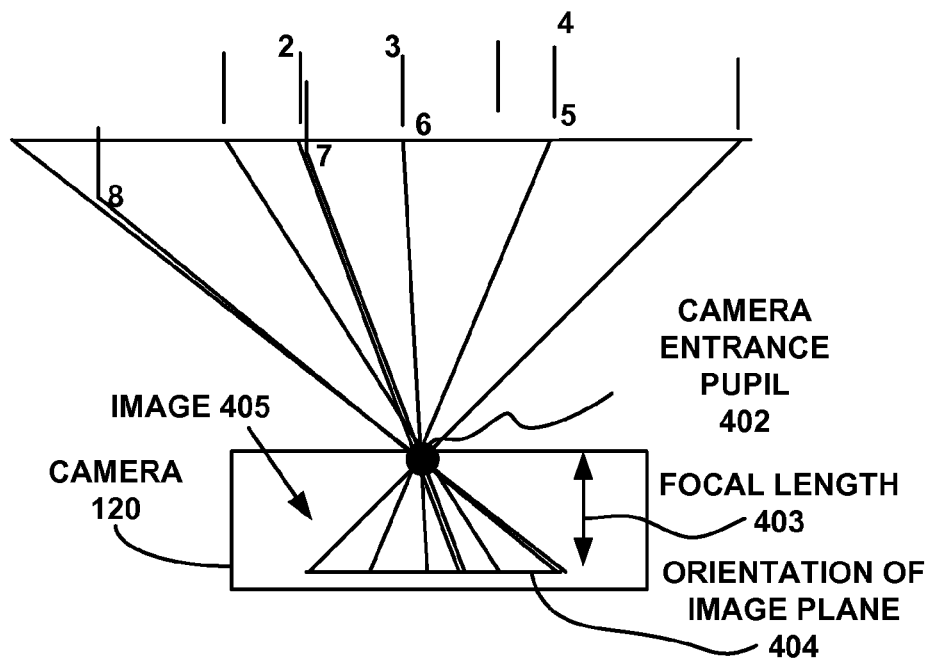
FIG. 4B is an example diagram of a camera taking an image of the terrestrial scene of FIG. 4A, according to an embodiment.

FIG. 4B is an example diagram of a camera 120 taking an image 405 of the terrestrial scene of FIG. 4A, according to an embodiment. For purpose of example, points of interest 1-8 are noted as being captured on the image plane 404. The internal workings of camera 120 are illustrated, including camera entrance pupil/lens 402, focal length 403, and image plane 404. It is appreciated that these internal workings can be calibrated via photogrammetry software 250 to correct for some optical distortions of image 405. In one embodiment, image 405 is provided by a user to system 100 for georeferencing. Then, known photogrammetry techniques can be used to determine the angles from the camera to the reference points as in FIG. 4B, and with this information, a user may locate the position of the entrance pupil of the imager/camera.

Figure 4C:
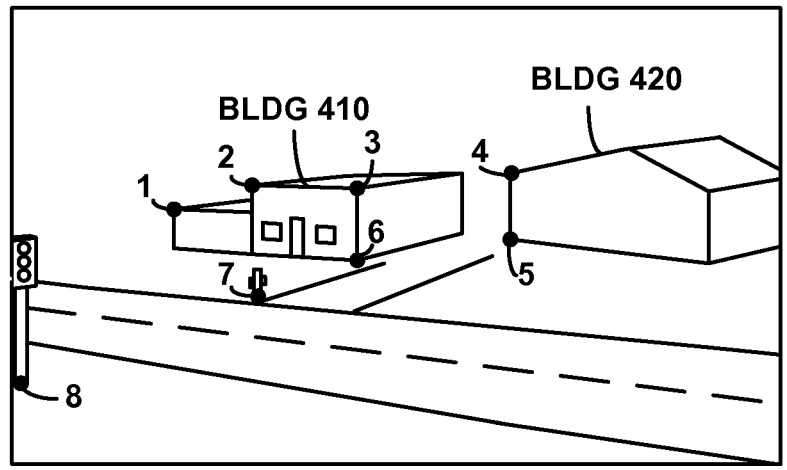
FIG. 4C is an image of the terrestrial scene of FIG. 4A, according to an embodiment.

FIG. 4C represents an image 405 of the terrestrial scene of FIG. 4A that has been captured by camera 120, according to an embodiment. Again, for purposes of example, points 1-8 are annotated. It is appreciated that one or more of points of interest can be user-annotated. For example, in one embodiment, a user may utilize feature selection processor 125 to annotate one or more points, such as point 6, for which georeferencing information is desired. Likewise, some of these points may be automatically annotated or selected for georeferencing by corner/edge sensing software of feature selection processor 125, reference feature determiner 215, and/or photogrammetry software 250. It is appreciated that in one embodiment, geographic location information regarding camera location 409 is accessed by camera 120 from a GNSS receiver 140 and automatically tagged into the metadata of the image file of image 405. In another embodiment, a user may manually provide similar information by manually tagging image 405 with location information such as the street address of building 410, or known survey point.

Figure 4D:
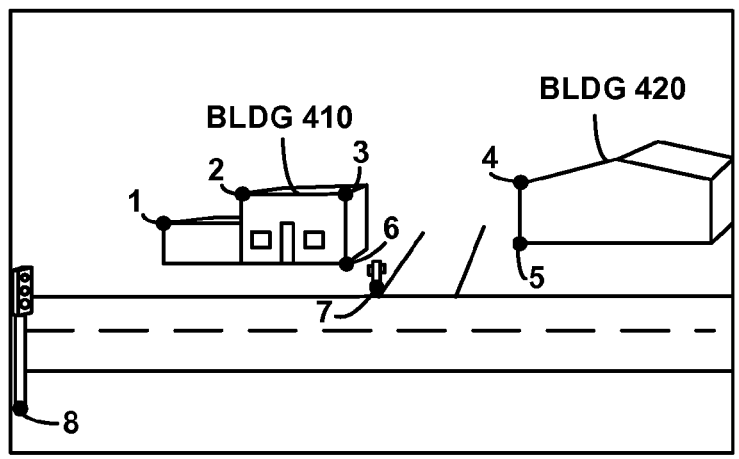
FIG. 4D is perspective adjusted image produced from the terrestrial scene image of FIG. 4C, according to an embodiment.

FIG. 4D is perspective-adjusted image 405' produced from the terrestrial scene image 405 of FIG. 4C, according to an embodiment. In one embodiment, this perspective adjustment is accomplished in image database management system 115 by image rectifier 255 rectifying image 405. This perspective-adjusted portion of image 405' facilitates scaling and distance interpolation from a georeferenced aerial (plan view) image that includes common features to those of image 405.

Figure 5:
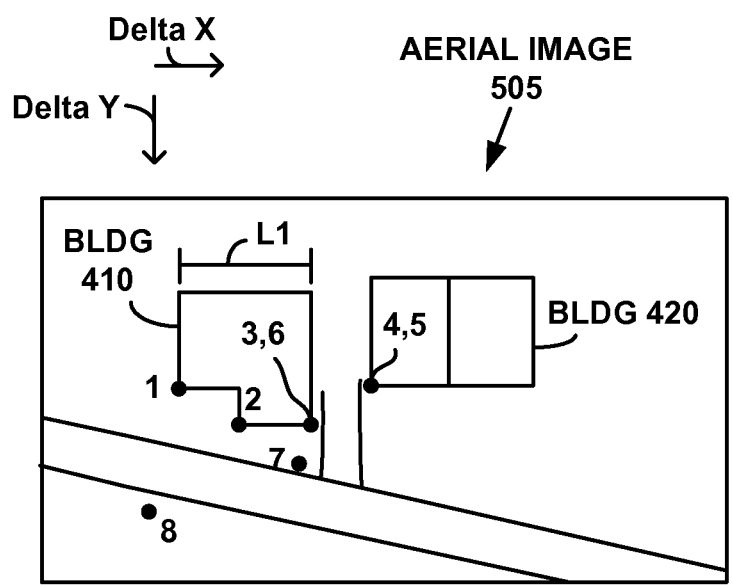
FIG. 5 is an aerial image, accessed from an image database, of the terrestrial scene of FIG. 4A, according to an embodiment.

FIG. 5 is an aerial image 505 of the terrestrial scene of FIG. 4A, according to an embodiment. In one embodiment, image 505 comprises an image that has been identified by image identification processor 210 from an image database 110 by searching on the location information tagged onto the image file of image 405. It is appreciated that in one embodiment, aerial image 505 may come from or be sourced from a public, private, or government image database (e.g., Google Earth™; Digital Globe; GeoEye; USGS; NGS; a private or public GIS database; or the like) or from image database 110. After being sourced from whatever location, aerial image 505 is maintained in image database 110 for access by image database management system 115. After inclusion in image database 110, georeferenced content of an image, such as image 505, may be updated as additional or more accurate georeferencing data related to the image becomes available.

Typically satellite type aerial imagery is georeferenced with coordinates such as latitude and longitude for at least top left and bottom right pixels in an image. In some instances every identifiable feature in a satellite type aerial image, and possibly every pixel in an image pixel, may be georeferenced. However, georeferencing type and accuracy varies by source. For example an engineering plan drawing or geographic information science drawing/map may georeference only selected surveyed building corners or prominent monuments. Sources of more accurate data than what is available from aerial photography will enable the collected data in the image-based database to better serve the needs of prospective users. For convenience of illustration, points 1-8 are annotated in image 505 and may be considered to be geofeferenced. For purposes of example, it can be assumed that points 1 and 3 are georeferenced, such as by latitude, longitude, and elevation within image 505. Reference feature determiner 215, in one embodiment, notes the overlap of points 1 and 3 between image 405 and image 505 and uses these as common reference points shared between the images. It is appreciated that, in some embodiments, one or more of the functions of reference feature determiner 215 may also be performed by a user or operator. Between these common points, feature locator 220 determines the length of span L1 in image 505 from the georeferenced information (e.g., latitude and longitude) associated with points 1 and 3 in image 505. In one embodiment, feature locator 220 accesses a GIS database, based upon the location information provided with image 405, and discovers surveyed GIS information associated with point 7 (the base of a fire hydrant) and point 8 (the base of a stop light).

In an embodiment where an aerial image with only latitude/longitude georeferencing (and no elevation) can be found, a two-level approach can be utilized. First, the generally available georeferenced aerial imagery is used. This gives a mechanism for determining approximate camera location, during time of image capture, in two dimensions. If image database 110 or another source contains two or more surveyed control points in that fall in the field of view of the selected/received image (e.g., points 1 and 3), then they can be used in accordance with techniques of survey and photogrammetric science (a) to increase the accuracy of the camera location and (b) to enable elevation calculation. Additionally, other façade or elevation views that correlate to the selected/received image can be searched for in order to further refine georeferenced information related to the selected/received image and/or to provide elevation information related to the selected/received image.

Figure 6:
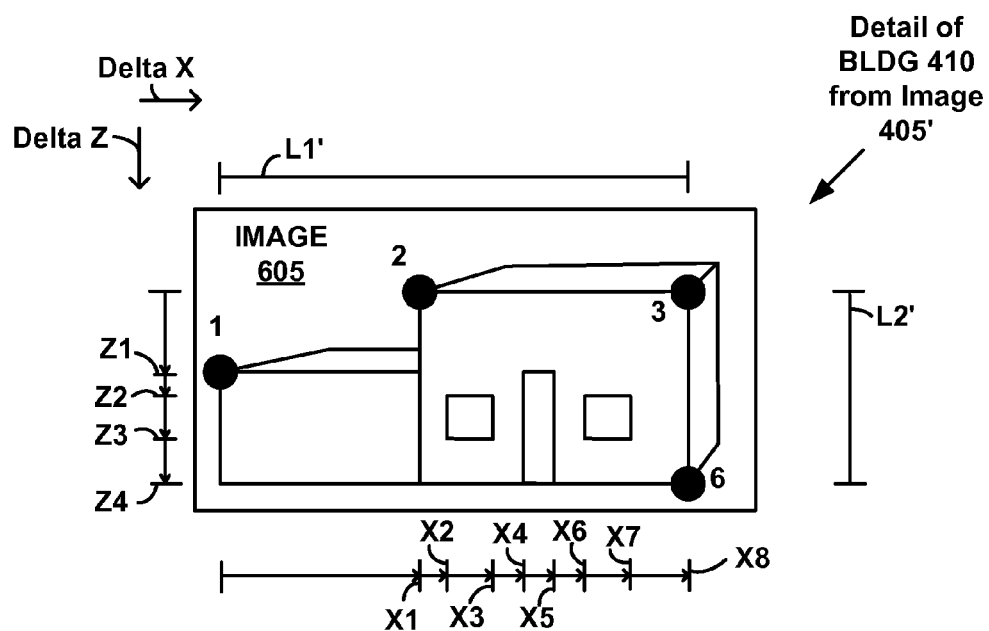
FIG. 6 is a detail view of a portion of the perspective adjusted image of FIG. 4D scaled according to information associated with the aerial image of FIG. 5, according to an embodiment.

FIG. 6 is a detail view 605 of a portion of the perspective adjusted image 405' of FIG. 4D. Detail view 605 is scaled according to information associated with the aerial image 505 of FIG. 5, according to an embodiment. As shown, known length L1 is scaled as L1' between points 1 and 3 which were determined as common reference points between image 505 and image 405. Various points of interest, such as the relative (delta) x-axis coordinates of points 2 and 6 can be scaled from distance L1'. These distances are shown as X1 through X8. Following the same scale as L1 a measuring stick in the z-axis is created to measure various scaled distances, such as measuring relative (delta) z-axis coordinates from point 3 to the delta z-axis coordinates of points 1, 6 and other locations in between. These z-axis distances are shown as Z1 through Z4, relative to a Z-coordinate of point 3, where: Z1 is a height of point 1; Z2 is a height of the upper corner of a window; Z3 is the height of the lower corner of the window; and Z4 is a height of point 6. In one embodiment, feature locator 220 automatically accomplishes such scaling in conjunction with image 405', to determine coordinate information for points 2, 4, 5, and 6.

In one embodiment, when a Z-coordinate such as for point 3 is known, scaling can be used as previously described. Alternatively, when such a Z-coordinate is not available from any database, or its accuracy is insufficient, a Z-coordinate for scaling can be obtained if a GNSS receiver with desired accuracy is available for use with the camera which captures an image such as image 405. For example, if GNSS receiver 140 is associated with camera 120, and a height measurement of camera 120 is appended to the X and Y coordinate measurements for camera location 409, then this height measurement can serve as the "control point" or anchor for determining additional vertical dimensions. With reference to perspective view 400 of FIG. 4A, this can be accomplished by leveling camera 120 so vertical axis 321 in camera 120 is parallel to the gravity vector. This makes the orientation (see FIG. 4B) of image plane 404 of camera 120 "vertical." With respect to the line between points 3 and 6, this line is aligned, or substantially aligned with the gravity vector as well, thus allowing it to be used for scaling vertical dimensions.

Following this example, a picture is then taken with camera 120 and the z-coordinate height of camera location 409 is associated with a location on the line between points 3 and 6 that is horizontal to this line and directly (horizontally) in line with the GNSS adjusted height associated with the center of the image plane of camera 120. Next, in some embodiments, image rectification is performed via the rotation method whereby the image is rotated about the axis defined by the line from point 3 to point 6 until the top and bottom front edges of building 410 are perpendicular to the line between points 3 and 6 (as illustrated in FIG. 6). Now, a horizontally determined scale factor L2', scaled with respect to L1', may be used for vertical measurements as well. For example, when scaling, start with point 6 (ground level) and measure how high point 3 is above point 6. This measurement is point 3's altitude, or height, which was not previously known. This can be added to image database 110. Scaling then proceeds downward from the horizontal optical axis intersection on the vertical line between point 3 and 6, to find what ground level is, relative to the predetermined vertical height of the optical axis as measured by GNSS receiver 140. This is found by associating the scaled distances to the Z-coordinate height of camera position 409 as determined on the line between points 3 and 6. It is appreciated that similar Z-coordinate determination can be determined without a GNSS receiver, if camera 120 is positioned at a measured height above a surveyed point at camera location 409 when an image, such as image 405, is captured.

In one embodiment, image rectification need not be performed if the points of interest for which Z-dimensions are begin determined are located along a selected vertical edge of an object that is already substantially in line with the gravity vector. By substantially, what is meant is that the vertical edge is within a few degrees of matching the line of the gravity vector. Such a vertical line will have the same scale, or substantially the same scale, for vertical distance as the horizontal scale. An example is the vertical edge between points 4 and 5, or 3 and 6, in FIG. 4D or FIG. 7. Typically only minimal scaling error will be experienced if a vertical edge is only substantially in line with the gravity vector, rather than perfectly in-line. Such minimal error may be acceptable in many circumstances.

It should also be appreciated that where the horizontal and vertical axes of an image have the same scale, image pixels in a captured image can also be used for scaling. For example, in one embodiment when the image pixels have known dimensions and a distance between reference points on a horizontal axis in a selected/received image is known, horizontal and vertical measurements in the selected/received image can be scaled or interpolated from a known geolocated point in the image-based on known pixel dimensions of the selected/received image. Additionally, by counting pixels between known locations in an image and knowing the angular displacement of pixels in an image plane, accurate scaling can be approximated by working from an image of sufficient resolution (e.g. in the range of 8 mega pixels or higher). For example, one or more dimensions of a pixel or plurality of pixels can be established or estimated relative to a known width, length, height, or distance between known geolocated points in an image. Such determined pixel dimensions can then used for scaling (by counting pixels) from a known geolocated point in the image in order to determine locations of other points in the image.

Techniques of close range photogrammetry are well known in the art and can be used for finding dimensions of items in a selected/received image from reference or control points. As but one example, a book called Close Range Photogrammetry, by T. Luhmann, S. Robson, S. Kyle and I. Harley (Whittles Publishing, 2006; ISBN 0-470-10633-6), describes numerous techniques of close-range photogrammetry in great detail. System 100 facilitates finding the reference points related to a selected/received image such that these close-range photogrammetry techniques and other techniques can be utilized for geolocating points of interest within the selected/received image.

Figure 7:
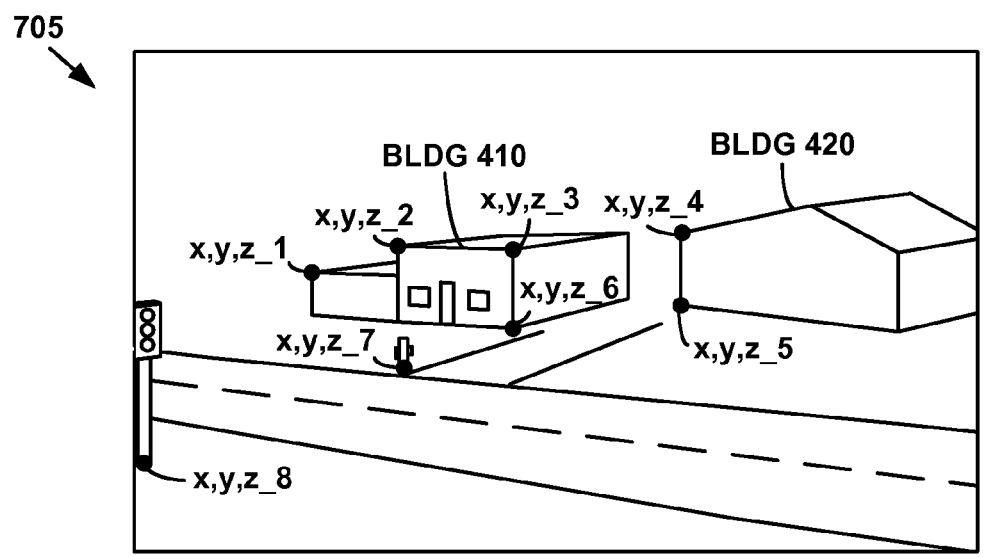
FIG. 7 is an augmented version of the terrestrial image of FIG. 4B that has been augmented with georeferenced information, according to an embodiment.

FIG. 7 shows image 705, which is an augmented version of the terrestrial image 405 of FIG. 4C. Image 705 has been annotated with georeferenced information at points 1-8, according to an embodiment. In one embodiment, augmenter 260 accomplishes this annotation which comprises annotating or otherwise associating augmented coordinate information with one or more reference points or features of interest within image 405 to create annotated image 705. As shown in annotated image 705, x, y, and z coordinates for points 1-8 have been annotated on image 705. For purposes of example, the annotated coordinates have been represented in the form "x,y,z_point#" in image 705. However, it is appreciated that such annotations would typically be specified in the form of a coordinate system, such as latitude, longitude, and elevation.

Figure 8:
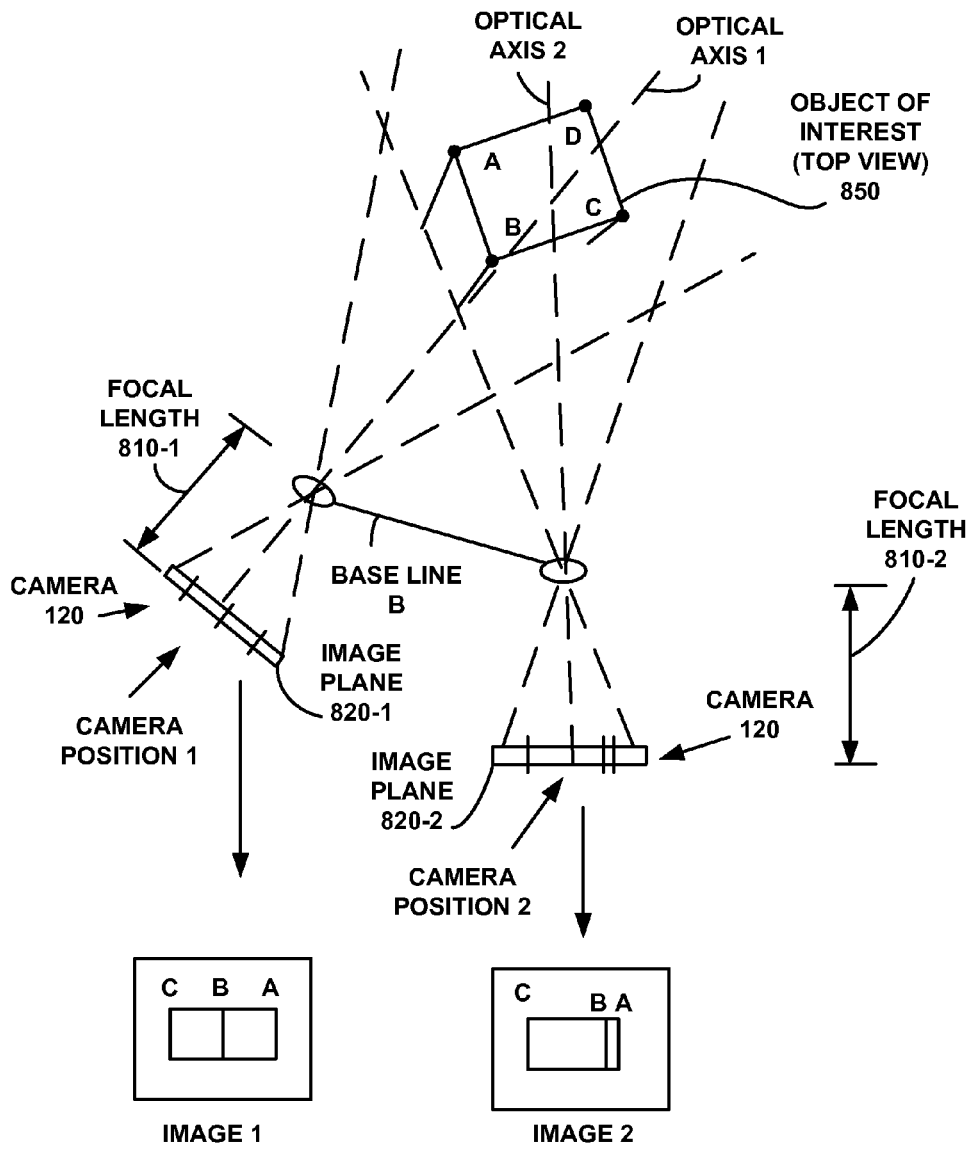
FIG. 8 is a diagram illustrating an example of close-range photogrammetry, according to an embodiment.

FIG. 8 is a diagram illustrating an example of close-range photogrammetry, according to an embodiment. For purposes of clarity of illustration, the example of FIG. 8 describes close-range photogrammetry techniques in two dimensions. However, it is appreciated that photogrammetry systems normally work with three dimensions. In FIG. 8, an object of interest 850 is shown and has been imaged by a single camera 120 from two different image locations. Of the labeled points A, B, C, and D on object of interest 850, three (A, B, and C) are imaged in image 1 taken on image plane 820-1 at camera position 1 and also in image 2 taken on image plane 820-2 at camera position 2. At camera position 1, camera 120 had a focal length 810-1, while at camera position 2, camera 120 had a focal length of 810-2. It is appreciated that these focal lengths would typically be the same for the same camera 120 absent adjustment of a zoom or other alteration of the lens of camera 120. However, they can be different, especially in a situation where different cameras are used. Such a situation can occur, for example, in an embodiment where one of the images is taken by a user and the other is matched to that image and retrieved from image database 110. In one such example, image 1 is taken by a user and submitted to image-based georeferencing system 100, which then uses image 1 to retrieve image 2 from image database 110. It is appreciated that since image 2 exists in image database 110, it will typically have geolocation information associated with one or more points or features in image 2. In one embodiment, for example image 2 has geolocation information in the form of surveyed coordinates associated with points A, B, and C and camera position 2.

As depicted in FIG. 8, a baseline B exists between camera position 1 and camera position 2. In an embodiment where the location of camera positions 1 and 2 are unknowns, a georeferenced aerial image of object of interest 850 can be identified from image database 110, such as by searching for a match based on a general vicinity (e.g., the town) in which object of interest 850 is known to be located. If enough points are common (e.g. A, B, and C or other common points to both images) and georeferenced in the identified image, the locations of camera position 1 and camera position 2 can then be determined via triangulation techniques baseline B can then be inferred from the calculated locations of camera position 1 and camera position 2. Then, by following close-range photogrammetry techniques, distances to any feature visible in both image 1 and image 2 can be determined from camera position 1 or camera position 2.

Additionally, it is appreciated that in many embodiments, baseline B will be known or easily determined. For example, in a case where camera 120 includes GNSS receiver 140 (as illustrated in FIG. 3B) and a user captures image 1 and image 2, baseline B is easily determined from GNSS information captured in conjunction with image 1 and image 2. Likewise, in a situation where a user a user captures only one of image 1 or image 2, GNSS information captured in conjunction with the user captured image can be used in conjunction with geolocation information associated with the other of the two images (which is identified and retrieved from image database 110) in order to determine baseline B. It is appreciated that coordinate system transformer 245 may be employed to transform coordinates of image 1 and image 2 into a common coordinate system. At any rate, once baseline B is determined, close-range photogrammetry techniques can be used to determine geolocations of features common to both image 1 and image 2. For example, in a situation where baseline B is known and camera position 1 and camera position 2 are known, close-range photogrammetry techniques can be used to geolocate points A, B, and C and other points common to both image 1 and image 2.

Alternatively, in one embodiment, if the exact locations of the camera at points A and B are not known via accurate position determination techniques, then the camera location can be determined by triangulation techniques as previously described and shown in FIG. 4B, based on obtaining or deriving a series of reference points from the database.

Such a photogrammetry technique may yield information useful for a tourist or other amateur user, for example, who simply snaps one or two pictures of a building with a camera phone, uploads the images to system 100, and receives in return locations at which each of the images were captured and location information about object of interest 850. This photogrammetry technique also yields information of use to surveyors, geospatial and GIS professionals, who can simply take pictures of an area or object of interest, upload them to system 100 and receive information in return which will establish the locations of camera position 1 and/or camera position 2 and/or also allow the determination of the coordinates of any item visible in the field of both image 1 and image 2, without the use of specialized survey instruments or even a GNSS receiver.

Example Methods of Operation

Figure 9:
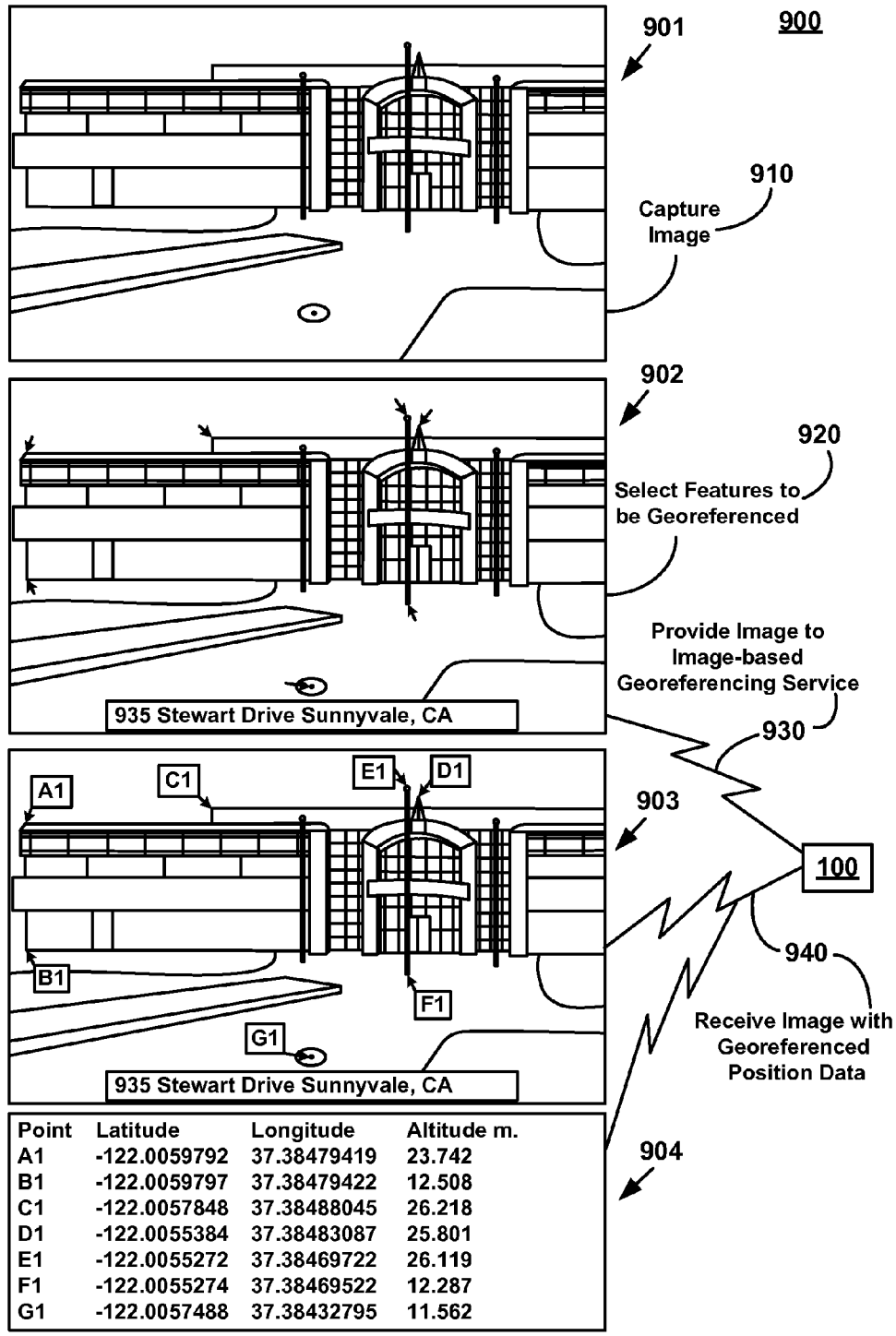
FIG. 9 is a pictorial flow diagram of an example method of using an image-based georeferencing service from the perspective of a user, according to an embodiment.

The following discussion sets forth in detail the operation of some example methods of operation of embodiments. FIG. 9 represents a sequence of images which have been processed according to embodiments previously cited. With reference to FIGS. 10 through 16, flow diagrams 1000, 1100, 1200, 1300, 1400, 1500, and 1600 illustrate example procedures used by various embodiments. Flow diagrams 1000, 1100, 1200, 1300, 1400, 1500, and 1600 include some procedures that, in various embodiments, are carried out by a processor under the control of computer-readable and computer-executable instructions. In this fashion, one or more of flow diagrams 1000, 1100, 1200, 1300, 1400, 1500, and 1600 are implemented using a computer, in various embodiments. The computer-readable and computer-executable instructions can reside in any tangible computer readable storage media, such as, for example, in data storage features such as computer usable volatile memory 1708, computer usable non-volatile memory 1711, peripheral computer-readable storage media 1702, and/or data storage unit 1712 (all of FIG. 17). The computer-readable and computer-executable instructions, which reside on tangible computer readable storage media, are used to control or operate in conjunction with, for example, one or some combination of processors 1706A, 1706B, and 1706C of FIG. 17, or other similar processor(s). Although specific procedures are disclosed in flow diagrams 900, 1000, 1100, 1200, 1300, 1400, 1500, and 1600, such procedures are examples. That is, embodiments are well suited to performing various other procedures or variations of the procedures recited in flow diagrams 1000, 1100, 1200, 1300, 1400, 1500, and 1600. Likewise, in some embodiments, the procedures in flow diagrams 1000, 1100, 1200, 1300, 1400, 1500, and 1600 may be performed in an order different than presented and/or not all of the procedures described in one or more of these flow diagrams may be performed.

Example User Perspective of Using an Image-Based Georeferencing Service

Although much has been discussed relative to the functioning of image-based georeferencing system 100, it is appreciated that a user of image-based georeferencing system should typically not be concerned with the details of this functioning. Instead, from a user's perspective, an image is submitted and georeferenced results are received in return.

FIG. 9 is a pictorial flow diagram 900 of an example method of using an image-based georeferencing service from the perspective of a user, according to an embodiment.

At 910 of diagram 900, in one embodiment, an image is captured. This is represented by image 901. It is appreciated that a camera, such as camera 120 is used to capture image 901. In one embodiment, when GNSS receiver 140 is utilized with camera 120, georeferenced information regarding a location of capture of image 901 is included with image 901, such as in metadata of or associated with an electronic file of image 901 (e.g. in the EXIF file).

At 920 of diagram 900, in one embodiment, features for georeferencing are selected in image 901 to create image 902. In one embodiment, feature selection processor 125 is used to select these features. In one embodiment, a user may also label general location information or other tags onto the image, such as an address (e.g., "935 Stewart Drive Sunnyvale, Calif."), which may be of use in locating georeferenced information related to the image. It is appreciated that such a label of general location information may also be inserted into metadata of the file of image 902 rather than into the view data of image 902. In image 902, seven small arrows point to seven features to be georeferenced (left upper corner of building; bottom left corner of building; left middle corner of building; peak above entranceway of building; top of flag pole; bottom of flagpole; and point in middle of manhole cover in parking lot). These arrows are user-inserted such as through the use of feature selection processor 125. These arrows provide a mechanism for identification of one or more points of interest for which georeferenced information (e.g., position fixes) are desired. It is appreciated that this is not strictly required, and that an image such as image 901 can be submitted without a user selection of features and in such case one or more reference features will be selected and georeferenced by the image-based georeferencing system (e.g., system 100). It is also appreciated that the features can be identified and selected in a similar fashion through other mechanisms besides arrows, such as by encircling features on an image for which a user desires to obtain georeferenced information.

At 930 of diagram 900, in one embodiment, the captured image (either image 901 or image 902) is provided for georeferencing. In one embodiment, this comprises uploading the image, such as via a wireless link from a camera or mobile communication device to image-based georeferencing system 100. In one embodiment, where the image (901 or 902) exists on a computer or system that also includes image-based georeferencing system 100, the image (901 or 902) is submitted to the image-based georeferencing system 100 for georeferencing.

At 940 of flow diagram 900, in one embodiment, a response is returned to the user in which an image is received along with georeferenced position data related to the image. In one embodiment, this comprises image-based georeferencing system 100 returning an image, such as image 903 to the location from which a request for georeferencing was received or else to a location such as an email account that has been specified by a user of image-based georeferencing system 100. As illustrated in FIG. 9, by image 903, in one embodiment, georeferenced points may be labeled (e.g., A1, B1, C1, D1, E1, F1, G1 in FIG. 903) on the returned image. This may include labeling coordinates of a georeferenced point in some format (e.g., latitude, longitude, elevation; Northing and Easting) on image 903. This may alternatively or additionally include providing a listing of the coordinates associated with georeferenced points in the returned image, such as has been illustrated by annotation file 904 which provides geospatial data regarding points A1, B1, C1, D1, E1, F1, G1 in returned image 903. It is appreciated that annotation file 904 can be provided in many formats, such as in metadata of image 903, as a table in a spreadsheet, or as an image, among other formats. For example, image 705 of FIG. 7 illustrates another non-limiting example of providing georeferenced coordinates of points in an image made available for user access.

Example Method of Obtaining Geolocation Information

FIG. 10 illustrates a flow diagram 1000 of an example method of obtaining geolocation information, according to an embodiment. Elements of flow diagram 1000 are described below, with reference to elements of one or more of FIGS. 1-9. In one embodiment, flow diagram 1000 represents a method of operation of all or a portion of system 100 from the perspective of a user.

At 1010 of flow diagram 1000, in one embodiment, a first image is captured. This captured image comprises a field of view that includes an object with an identifiable feature. The first image may be captured using a digital or film camera or, by scanning a print of a camera captured image, may be captured using an image scanner coupled with a computer. A digital camera may be a stand-alone camera, or a digital camera integrated as a part of another electronic device such as a mobile communications device (e.g., a mobile telephone, computer, or the like). In some embodiments, image capture can also comprise selecting an image file that exists on or is accessible from a computer or electronic device. An identifiable feature is a feature such as a physical object's peak, corner, base, projection other visible feature in the first image that can be marked and identified by a user via a graphic user interface of feature selection processor 125 or that can be picked out and determined by reference feature determiner 215. It is appreciated that feature selection processor 125 may be resident on a digital camera, on a device that includes a digital camera used for capturing the first image, on a mobile communications device, or on computer system/device with which the captured image can be annotated to select an identifiable feature. For example, a desktop computer with a display (e.g. display computer 130) can be used to access a digital file of the first image and the select an identifiable feature. Image 901 in FIG. 9 is one example of a first image. Arrows shown in image 902 identify a plurality of examples of identifiable features that have been identified.

At 1020 of flow diagram 1000, in one embodiment, the captured first image with the identifiable feature is provided to an image-based georeferencing system. The captured image is provided as a digital file, and the identifiable feature may or may not be identified by a user prior to providing the image to an image-based georeferencing system such as system 100. In one embodiment, for example, a user provides the captured first image from digital camera 120 to system 100 via a wireless transceiver or other communication device 135.

In some embodiments, the first image can be provided along with geographic data associated with the first image. This can be user added geographic data such as an address, zip code, or set of coordinates associated with a general location of the first captured image. Such general location information helps narrow searching requirements of system 100 for identifying a correlating image and/or other location information associated with the captured first mage. The geographic data supplied with the captured first image can also be geographic data that is automatically added to an image by a GNSS receiver coupled with a camera, such as camera 120, used to capture the first image. The geographic data can be added in various ways to include: being denoted in the viewable portion of the first image (e.g., super-imposed on the first image as shown in image 902) and/or being included in metadata of the digital file of the first image. In one embodiment, the geographic data provided with the captured first image includes location of capture of the captured first image as determined by a GNSS receiver. In one embodiment, for example, a GNSS receiver determined location of capture is automatically added to the metadata of the captured first image contemporaneously with image capture and then provided to the image-based georeferencing system as part of the digital file of the first image.

Once system 100 receives the captured image, such as by receiving it with image receiver/selector 205, image database management system 115 operates in the manner previously described herein to geolocate points on physical objects within the captured image. For example, in one embodiment image identification processor 210 identifies a second image from image database 110 that correlates to the first image; reference feature determiner 215 determines a reference feature common to both the first image and second image; and feature locator 220 identifies the georeferenced location of the reference feature. It is appreciated that the reference feature and a user-identified identifiable feature may be one in the same. If not, in one embodiment, enough reference features are located in the first image so that image database management system can geolocate a user-identified feature in the first image. Augmenter 260 annotates the reference feature(s) and any other geolocated identifiable features in the first image. As described, this annotation can occur in the viewable region of the first image or in a separate file from the first image. In this manner, a third image, augmented from the first image by inclusion of georeferenced annotations, may be created. This augmented third image and/or annotation file can be output, such as by output engine 230, for access by a user. By way of example and not of limitation, in one embodiment, image 405 represents a first image; point 6 represents an identifiable feature (which may be user-identified); and points 2 and 3 represent located reference features that are common with a first image 405 and second image 505.

At 1030 of flow diagram 1000, in one embodiment, an augmented version of the first image is received from the image-based georeferencing system. The augmented first image is augmented with location information regarding the location of one or more objects in the field of view of the first image. This can comprise system 100 providing the augmented version of the image along with coordinates of the identifiable feature and/or coordinates of the reference feature. The coordinates may be two-dimensional or three-dimensional coordinates. In one embodiment, system 100 provides the first image augmented with georeferenced location information regarding one or more user-selected points of interest in the field of view of the first image. One or more of these user-selected points of interest may be related to the identifiable object. In one embodiment, system 100 provides the first image augmented with geographic location information associated with one or more reference features that have been determined by system 100 (i.e. by reference feature determiner 215 and feature locator 220) in the field of view of the first image. It is appreciated that a reference feature may also be a user-selected point of interest and that a reference feature may be related to the identifiable object.

The augmentations of the augmented first image may include, among others: annotations that are visible to a user in the viewable region of the first image, such as superposition or overlay of information on the augmented version of the first image; information such as metadata that is not visible when viewing the augmented image; and some combination thereof. The augmentations can include location information related to one or more points that were in the viewable region of the first image. This augmented image may be accompanied by an annotation file or augmented information such as in the metadata of the augmented image, or the augmentation of the image may simply be the inclusion of a reference file/metadata that associates a pixel or pixels in the augmented image with location information. Image 903 of FIG. 9 shows one example of an augmented first image and annotation file 904 shows an example of the contents of one example of an annotation file. It is appreciated that the data in annotation file 904 may be referenced to pixel locations of image 902 rather than labeled points (e.g., A1-G1). Image 705 of FIG. 7 shows another example of an augmented version of a first image. In one embodiment, an augmented version of the first image is received in exchange for payment of a fee. It is appreciated that the number of augmentations provided in the form of location information related to features in an image may vary in accordance with the fee paid.

Example Method of Obtaining a Georeferenced Location

FIG. 11 illustrates a flow diagram 1100 of an example method of obtaining a georeferenced location, according to an embodiment. Elements of flow diagram 1100 are described below, with reference to elements of one or more of FIGS. 1-9. In one embodiment, flow diagram 1100 represents a method of operation of all or a portion of system 100 from the perspective of a user.

At 1110 of flow diagram 1100, in one embodiment, a first image is captured with a camera. This captured image comprises a field of view that includes an object with an identifiable feature. The first image may be captured using a digital or film camera or, by scanning a print of a camera captured image, may be captured using an image scanner coupled with a computer. A digital camera may be a stand alone camera, or a digital camera integrated as a part of another electronic device such as a mobile communications device (e.g., a mobile telephone, computer, or the like). In some embodiments, capture can also comprise selecting an image file that exists on or is accessible from a computer or electronic device. An identifiable feature is a feature such as a physical object's peak, corner, base, projection other visible feature in the first image that can be marked and identified by a user via a graphic user interface of feature selection processor 125 or that can be picked out and determined by reference feature determiner 215. It is appreciated that feature selection processor 125 may be resident on a digital camera, on a device that includes a digital camera used for capturing the first image, on a mobile communications device, or on computer system/device with which the captured image can be interacted to select an identifiable feature. For example, a desktop computer with a display (e.g., display computer 130) can be used to access a digital file of the first image and the select an identifiable feature. Image 901 in FIG. 9 is one example of a first image. Arrows shown in image 902 identify a plurality of examples of identifiable features that have been identified.

At 1120 of flow diagram 1100, in one embodiment, the captured first image with the identifiable feature is provided to an image-based georeferencing system. The captured image is provided as a digital file, and the identifiable feature may or may not be identified by a user prior to providing the image to an image-based georeferencing system such as system 100. In one embodiment, for example, a user provides the captured first image from digital camera 120 to system 100 via a wireless transceiver or other communication device 135.

In some embodiments, the first image can be provided along with geographic data associated with the first image. This can be user added geographic data such as an address, zip code, or set of coordinates associated with a general location of the first captured image. Such general location information helps narrow searching requirements of system 100 for identifying a correlating image and/or other location information associated with the captured first mage. The geographic data supplied with the captured first image can also be geographic data that is automatically added to an image by a GNSS receiver coupled with a camera, such as camera 120, used to capture the first image. The geographic data can be added in various ways to include: being denoted in the viewable portion of the first image (e.g., super-imposed on the first image as shown in image 902) and/or being included in metadata of the digital file of the first image. In one embodiment, the geographic data provided with the captured first image includes location of capture of the captured first image as determined by a GNSS receiver. In one embodiment, for example, a GNSS receiver determined location of capture is automatically added to the metadata of the captured first image contemporaneously with image capture and then provided to the image-based georeferencing system as part of the digital file of the first image.

Once system 100 receives the captured image, such as by receiving it with image receiver/selector 205, image database management system 115 operates in the manner previously described herein to geolocate points on physical objects within the captured image. For example, in one embodiment image identification processor 210 identifies a second image from image database 110 that correlates to the first image; reference feature determiner 215 determines a reference feature common to both the first image and second image; feature locator 220 identifies the georeferenced location of the reference feature. It is appreciated that the reference feature and a user-identified feature identifiable feature may be one in the same. If not, in one embodiment, enough reference features are located in the first image so that image database management system 115 can geolocate a user-identified feature in the first image. By way of example and not of limitation, in one embodiment, image 405 represents a first image; point 6 represents an identifiable feature (which may be user-identified); and points 2 and 3 represent located reference features that are common with a first image 405 and second image 505.

In one embodiment, location of capture determiner 225 operates to determine a location of capture of the image. Where a GNSS receiver determined location of capture of the first image has been provided, this may not be required. However, if a received GNSS determined location is of low accuracy, such as can happen in urban canyons and other environments, the GNSS receiver determined location may be refined to greater accuracy. Depending on the type of user (amateur or professional) and/or user specification, the location of captured data can be determined with varying levels of accuracy which may vary from an approximate street address in a city to two or three-dimensional coordinates of the location of capture that are triangulated from a plurality of GIS information or other geolocation information of reference features that system 100 geolocates within the image The determined location of capture of the camera during capture of the first image can then be output, such as by output engine 230, for access by a user.

At 1130 of flow diagram 1100, in one embodiment, a georeferenced location of the camera during capture of the first image is received from the image-based georeferencing system. As described above, this georeferenced location is determined by image-based georeferencing system 100 based upon GIS information associated with a plurality of reference features found, by system 100, to be present in the first image. In one embodiment, the georeferenced location of capture of the camera during capture of the first image is received in exchange for payment of a fee for such information.

Example Method of Providing Position Information

FIG. 12 illustrates a flow diagram 1200 of an example method of providing position information, according to an embodiment. Elements of flow diagram 1200 are described below, with reference to elements of one or more of FIGS. 1-9. In one embodiment, flow diagram 1200 represents a method of operation of all or a portion of system 100.

At 1210 of flow diagram 1200, in one embodiment, a cataloged second image is identified that correlates to a first image. The second image is identified within or through the use of an image-based georeferencing system. In one embodiment, this comprises image-based georeferencing system 100 identifying the second image from an image database 110 or other accessible store of cataloged images. For example, when the first image is an elevation view of a building, the identified second image may be georeferenced elevation view of the building or a georeferenced aerial/plan view of the building. In one embodiment, the second image is identified through the use of an image recognition algorithm that compares the first image with a plurality of cataloged images in a georeferenced image database, such as image database 110 to identify the second image that correlates to the first image. In one embodiment, image identification processor 210 identifies a second image that correlates to the first image. For example, in an embodiment where image 405 is the first image, image 505 represents one example of a second image that may be identified by image identification processor 210.

It is appreciated that the first image comprises a terrestrial scene that includes at least one physical object with an identifiable feature. The object can be a natural or manmade object. Several examples of such images have been included and/or described previously herein. The first image may be selected by or received from a user of system 100 or some portion thereof. For example, in one embodiment, the first image may be selected from a storage location on a network or on a storage device (e.g., data storage unit 1712 of FIG. 17). In one embodiment, the first image may be received from a user who captures the first image with a digital camera, such as camera 120. In one embodiment, geographic data associated with the first image may be received in conjunction with receipt of the first image. As previously described, this may include geographic location information regarding the location of capture of the first image and/or geographic location information regarding an identifiable feature in the field of view of the first image.

At 1220 of flow diagram 1200, in one embodiment, a reference feature is determined that is common to both the second image and the first image. System 100 and/or image database management system 115 operates in the manner previously described herein to geolocate points on physical objects within first image. For example, in one embodiment, reference feature determiner 215 determines a reference feature common to both the first image and second image. Following the example illustrated by image 405 and image 505, in one embodiment, point 6 represents an identifiable feature (which may be user-identified); and points 2 and 3 represent reference features (as determined by reference feature determiner 215) are common with the first image 405 and the second image 505. Reference feature determiner 215 can operate in a fully automated fashion or involve human assistance where fully automated determination of a common reference feature is not possible.

At 1230 of flow diagram 1200, in one embodiment, geographic information related to the common reference feature or features is accessed. This can comprise accessing a GIS database or other geographic location information database that is related to the second image, which is typically a cataloged image of image database 110 or other image repository, in order to determine geographic information regarding the common reference feature. In one embodiment, feature locator 220 identifies the georeferenced location of the reference feature. It is appreciated that the reference feature and a user-identified identifiable feature may be one in the same. If not, in one embodiment, enough reference features are located in the first image so that image database management system 115 can geolocate a user-identified feature in the first image.

In one embodiment, for example, feature locator 220 accesses a geographic location information repository or database that is related to the common reference feature. If, for example, in one embodiment, the common reference feature is a street sign in Aurora, Nebr., feature locator 220 would access street/road geographic location information related to Aurora, Nebr. from one or more public and/or private geographic location information repository and/or database in order to find geographic location information for the street sign. If the second image happens to include location information regarding the common reference feature, access to geographic location information system may not be required. Following the above example illustrated with image 405 and image 505, in one embodiment this comprises feature locator 220 locating coordinates for points 2 and/or 3 of image 505.

At 1240 of flow diagram 1200, in one embodiment, the geographic location information regarding the common reference feature is provided for access by a user of the image-based georeferencing system. In one embodiment, this comprises output engine 230 providing the geographic location information for access in any of the previously described manners. For example, in one embodiment, this comprises output engine 230 providing a third image that is a georeferenced version of the first image. The georeferencing can comprise the third image including geographic location information that is annotated or otherwise augmented relative to the common reference feature. Image 903 and annotation file 904 describe one example of a method of providing the third image. It is appreciated that, in one embodiment, the georeferenced information can be included in a user visible portion of the third image, such as by superimposition. Image 705 shows one example of superimposed georeferenced location information for points 2 and 3, among others. Additionally, the geographic location information regarding the common reference feature is, in some embodiments, provided for access by a user in exchange for a payment of a fee.

Moreover in one embodiment the third image, with its georeferenced information regarding the common reference feature is stored in a database of georeferenced images, such as image database 110. This "grows" the database and enriches its content constantly through use of system 100.

Figure 13:
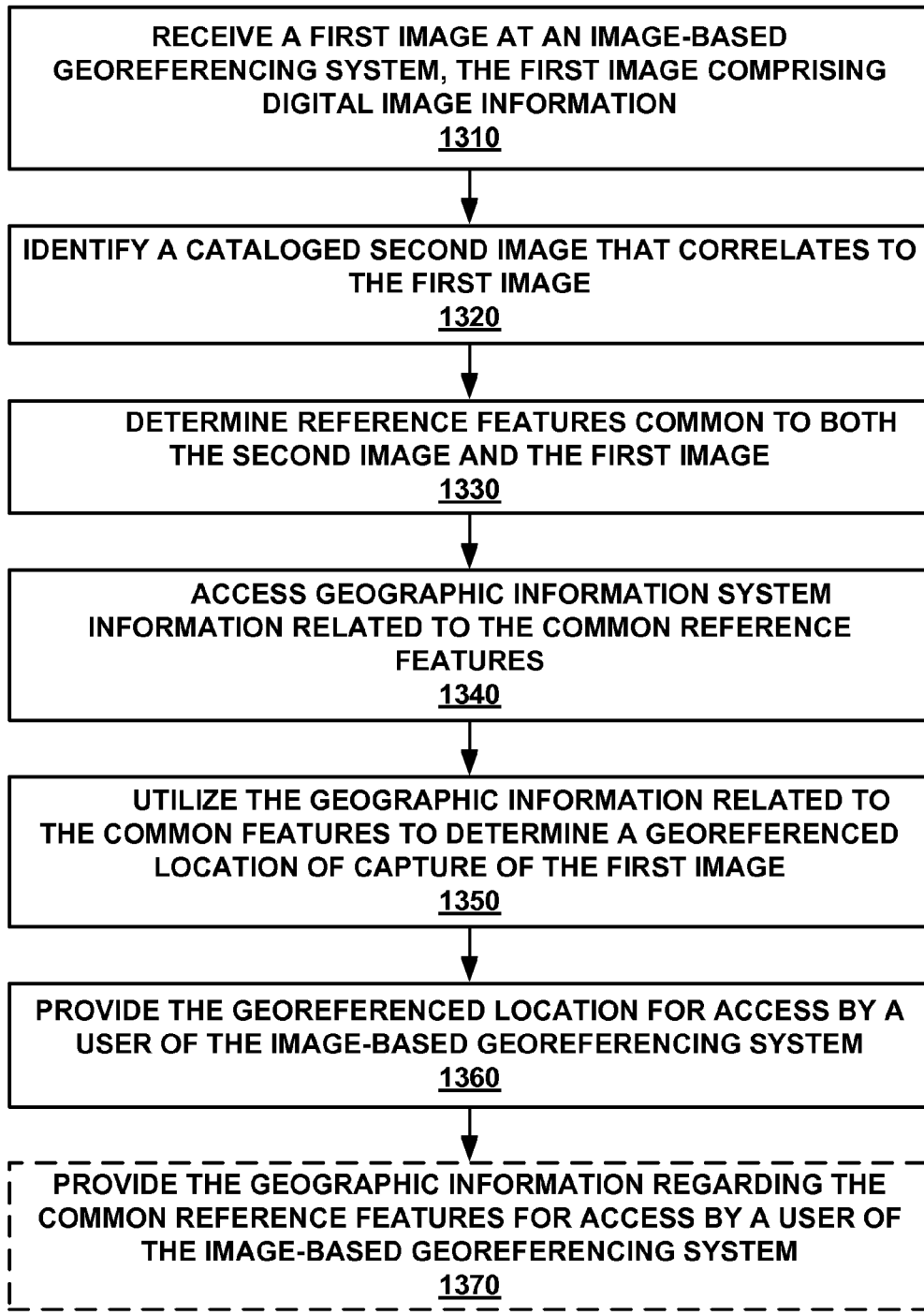
FIG. 13 is a flow diagram of an example method of providing georeferenced information regarding a location of capture of an image, according to an embodiment.

Example Method of Providing Georeferenced Information Regarding a Location of Capture of an Image FIG. 13 illustrates a flow diagram 1300 of an example method of providing georeferenced information regarding a location of capture of an image, according to an embodiment. Elements of flow diagram 1300 are described below, with reference to elements of one or more of FIGS. 1-9. In one embodiment, flow diagram 1300 represents a method of operation of all or a portion of system 100.

At 1310 of flow diagram 1300, in one embodiment, a first image is received at an image-based georeferencing system. The first image comprises digital image information of a digital image file. In one embodiment, for example, image receiver selector 205 of image-based georeferencing system 100 receives this first image. It is appreciated that the first image comprises a terrestrial scene that includes at least one physical object with an identifiable feature. The object can be a natural or manmade object. Several examples of such images have been included and/or described previously herein. The first image may be selected by or received from a user of system 100 or some portion thereof. For example, in one embodiment, the first image may be selected by a user from a storage location on a network or on a storage device (e.g., data storage unit 1712 of FIG. 17) and then provided to or received by image identification processor 210. In one embodiment, the first image may be received by image receiver/selector 205 from a user who captures the first image with digital camera, such as camera 120. It is appreciated that, in one embodiment, the digital camera may be included in a mobile communications device. In one embodiment, geographic data associated with the first image may be received in conjunction with receipt of the first image. As previously described, this may include geographic location information regarding the location a camera at time of capture of the first image and/or geographic location information regarding an identifiable feature in the field of view of the first image. This may include geographic location information related to a natural or manmade structure that is in a field of view of the first image. It is appreciated that the geographic location information that is provided may vary from very general, such as an address of a building, to very specific such as surveyed coordinates of a base of flagpole.

At 1320 of flow diagram 1300, in one embodiment, a cataloged second image is identified that correlates to the received first image. The second image is identified at an image-based georeferencing system. In one embodiment, this comprises image-based georeferencing system 100 identifying the second image from an image database 110 or other accessible store of cataloged images. For example, when the first image is an elevation view of a building, the identified second image may be georeferenced elevation view of the building or a georeferenced aerial/plan view of the building. In one embodiment, the second image is identified through the use of an image recognition algorithm that compares the first image with a plurality of cataloged images in a georeferenced image database, such as image database 110 to identify the second image that correlates to the first image. In one embodiment, image identification processor 210 performs the identification of the second image that correlates to the first image. In an embodiment where image 405 is the first image, image 505 represents one example of a second image that may be identified by image identification processor 210. If automated identification is not possible, in one embodiment, assistance by a human may be involved in identifying the second image.

At 1330 of flow diagram 1300, in one embodiment, reference features are determined that are common to both the second image and the first image. For example, in one embodiment, system 100 and/or image database management system 115 operates in the manner previously described herein to determine common reference features. This can be a fully automated process or can involve some human involvement where fully automated determination of common reference features is not possible. For example, in one embodiment, reference feature determiner 215 determines a plurality of reference features common to both the first image and second image. With reference to the example illustrated by image 405 and image 505, in one embodiment, reference feature determiner 215 determines that points 1, 2, and 4 are common reference features to both of these images.

At 1340 of flow diagram 1300, in one embodiment, geographic location information related to the common reference features is accessed. This is done in a similar fashion as has been previously described in conjunction with description of 1230 of flow diagram 1200. In one embodiment, this comprises accessing a geographic location information database that is related to the cataloged second image (e.g., image 505 in the ongoing example). If the common reference features are not all represented in a single geographic location information repository, such as GIS locations 160, then a plurality of geographic location information repositories or other geolocation resources such as photos 155 and maps 150 are accessed. In one embodiment, for example, feature locator 220 identifies the georeferenced location of the reference features. In one embodiment, feature locator 220 locates enough of the reference features the first image so that image database management system 115 can geolocate a user-identified feature in the first image and/or a geolocate or refine a location of capture of the first image. When triangulation is being used this typically means that at least three non-collinear reference features common to both the first image and the second image are geolocated for use in triangulation. Following the above example, in one embodiment feature locator 220 locates the coordinates of points 1, 2, and 5 of image 505.

At 1350 of flow diagram 1300, in one embodiment, the GIS information related to the common features is used to determine a georeferenced location of capture of the first image. When the location of capture is already known, such as due to a GNSS receiver being utilized in conjunction with capturing the first image, this may not be required. However, GNSS determined locations may not exhibit optimum accuracy due to poor satellite visibility to the antenna of a GNSS receiver. Thus, in some embodiments, the geographic location information related to the common features is also used to refine accuracy of generally or even fairly accurately known geographic location information related to the location of capture of the first image. In one embodiment, location of capture determiner 225 uses the geographic location information related to the common features (e.g., points 1, 2, and 5 in the ongoing example illustrated by image 405 and image 505) to determine the georeferenced location of capture of the first image (i.e., camera location 409). As previously described this can involve one or more techniques such as triangulation, scaling, or techniques of close-range photogrammetry to determine the location of points in the first image and to use those points/locations to determine and/or refine the location of a camera during capture of the first image.

At 1360 of flow diagram 1300, in one embodiment, the georeferenced location of capture is provided for access by a user of the image-based georeferencing system. In one embodiment, this comprises output engine 230 providing the location of capture for user access in any of the previously described manners. For example, in one embodiment, this comprises output engine 230 emailing or otherwise pushing the location of capture out to a user or else making the location of capture available for download/network access/pull at the user's discretion. The georeferencing can comprise the third image including geographic location information that is annotated relative to the common reference feature. Additionally, the location of capture may be pushed to the user or made available for pull by the user, in some embodiments, in exchange for a payment of a fee.

At 1370 of flow diagram 1300, in one embodiment, the method further comprises providing the geographic location information regarding the common reference features for access by a user of the image-based georeferencing system. In one embodiment, output engine 230 facilitates user access of geographic location information regarding the common reference features and/or other geolocation information that has been determined regarding the first image during the process of determining the location of capture of the first image. In a similar manner as described in 1240 of flow diagram 1200, output engine 230 either pushes such information to the user or a desired user location or made available such information for user pull.

Example Method of Updating a Database of Georeferenced Images

Figure 14:
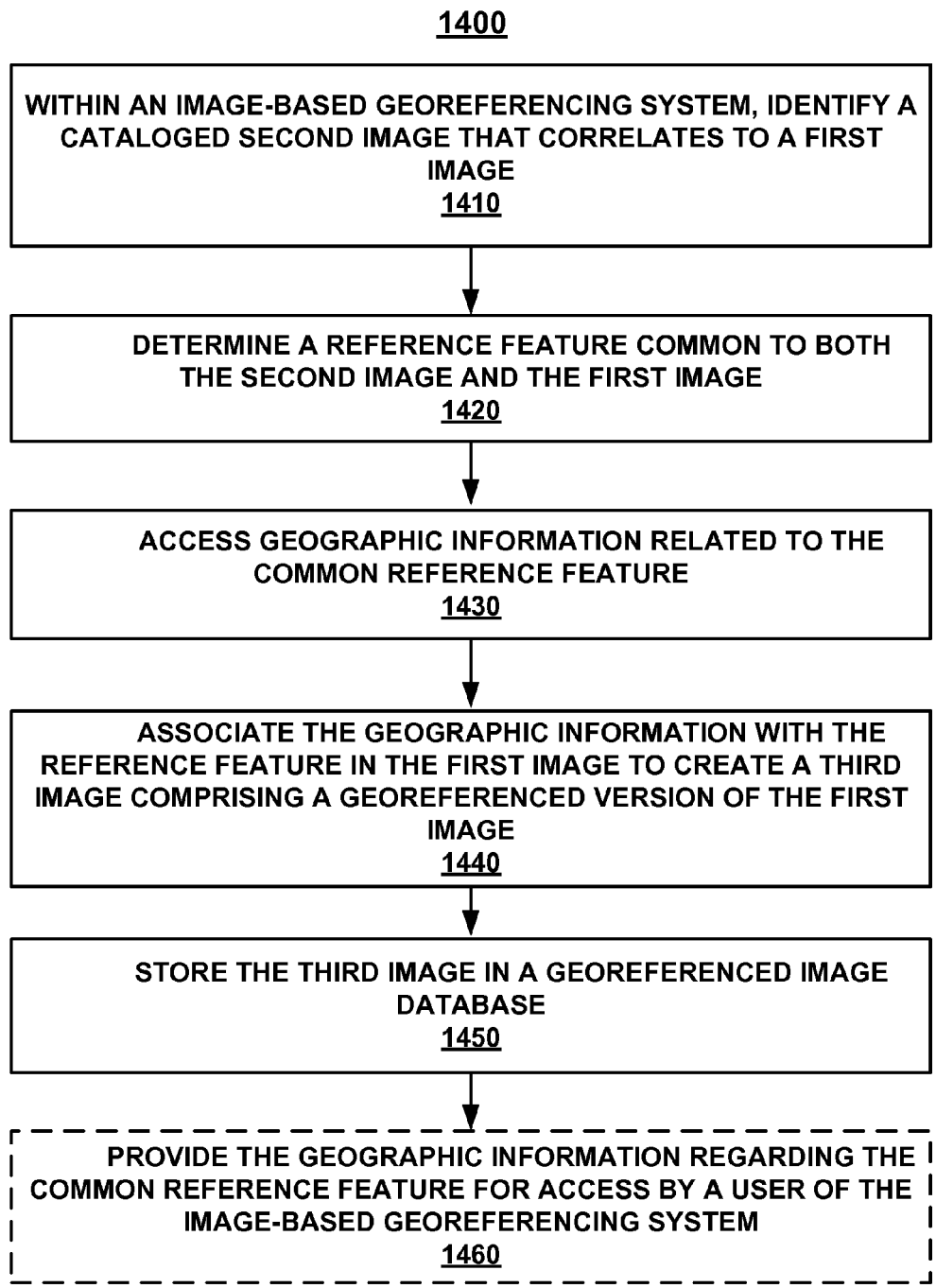
FIG. 14 is a flow diagram of an example method of updating a database of georeferenced images, according to an embodiment.

FIG. 14 illustrates a flow diagram 1400 of an example method of 1) identifying and locating georeference information for a selected feature, and 2) updating a database of georeferenced images, according to an embodiment. Elements of flow diagram 1400 are described below, with reference to elements of one or more of FIGS. 1-9 and 12. In one embodiment, flow diagram 1400 represents a method of operation of all or a portion of system 100.

At 1410 of flow diagram 1400, in one embodiment, a cataloged second image is identified that correlates to a first image. The second image is identified within or through the use of an image-based georeferencing system. In one embodiment, this comprises image-based georeferencing system 100 identifying the second image from an image database 110 or other accessible store of cataloged images. For example, when the first image is an elevation view of a building, the identified second image may be georeferenced elevation view of the building or a georeferenced aerial/plan view of the building. In one embodiment, the second image is identified through the use of an image recognition algorithm that compares the first image with a plurality of cataloged images in a georeferenced image database, such as image database 110 to identify the second image that correlates to the first image. In one embodiment, image identification processor 210 performs the identification of the second image that correlates to the first image. In an embodiment where image 405 is the first image, image 505 represents one example of a second image that may be identified by image identification processor 210.

It is appreciated that the first image comprises a terrestrial scene that includes at least one physical object with an identifiable feature. The object can be a natural or manmade object. Several examples of such images have been included and/or described previously herein. The first image may be selected by or received from a user of system 100 or some portion thereof. For example, in one embodiment, the first image may be selected from a storage location on a network or on a storage device (e.g., data storage unit 1712 of FIG. 17). In one embodiment, the first image may be received from a user who captures the first image with a digital camera, such as camera 120. In one embodiment, geographic data associated with the first image may be received in conjunction with receipt of the first image. As previously described, this may include geographic location information regarding the location of a camera at the time of capture of the first image and/or geographic location information regarding an identifiable feature in the field of view of the first image.

At 1420 of flow diagram 1400, in one embodiment, one or more reference feature are determined that are common to both the second image and the first image. This comprises system 100 and/or image database management system 115 operating in the manner previously described herein to geolocate points on physical objects within first image. Reference feature determiner 215 determines a reference feature or features common to both the first image and second image. Following the example illustrated by image 405 and image 505, in one embodiment, reference feature determiner 215 determines that points 2 and 3 are reference features common to both images. Reference feature determiner 215 can operate in a fully automated fashion or involve human assistance where fully automated determination of a common reference feature is not possible.

At 1430 of flow diagram 1400, in one embodiment, geographic location information related to the common reference feature is accessed. This can comprises accessing a geographic location information database that is related to the second image, which is typically a cataloged image of image database 110 or other image repository, in order to determine geographic location information regarding the common reference feature. In one embodiment, feature locator 220 identifies the georeferenced location of the reference feature or features. It is appreciated that a reference feature and a user-identified identifiable feature may be one in the same. If not, in one embodiment, enough reference features are located in the first image so that image database management system 115 can geolocate a user-identified feature in the first image. As previously described in accordance with 1220 of FIG. 12, in one embodiment, for example, feature locator 220 accesses a GIS repository or database that is related to the common reference feature. Following the example illustrated by image 405 and image 505, in one embodiment, feature locator 220 locates coordinates for points 2 and 3, the determined reference features common to both images.

At 1440 of flow diagram 1400, in one embodiment, the geographic location information from 1430 is associated with the reference feature or features in the first image to create a third image that comprises a georeferenced version of the first image. In one embodiment, augmenter 260 of image database management system 115 associates the geographic location information with the reference feature(s) to create the annotated/augmented third image. Image 903 and image 705 illustrate two non-limiting examples of such a third image. Image 705 corresponds to the example that has been described with reference to image 405 and image 505.

At 1450 of flow diagram 1400, in one embodiment, the third image is stored in a georeferenced image database. In one embodiment, this comprises output engine 230 storing the third image in image database 110 or another image database/repository. In this manner, additional georeferenced images are added to image database 110 through the use of system 100.

In some embodiments, georegistration information accompanies a first image. For example, a user may provide a GNSS determined location of capture of the first image and/or surveyed coordinates of features in the first image. In one embodiment when such georegistration information regarding the first image is available a comparison of this georegistration information is made to any existing georegistration regarding identifiable features and/or reference features that is visible in the field of view of the second image. For example, in one embodiment, in conjunction with storage of the third image, registration comparer 235 compares georeferenced registration information received in conjunction with the first image to existing georeferenced registration information associated with the cataloged image (the second image) to determine which is more accurate. As has been described herein, in one embodiment, the accuracy determination is based upon comparison of accuracy of sources of the various georeferenced registration information.

Provenance checker 237 and/or Z-coordinate accuracy estimator 239 may be employed, in one embodiment, to assist in the comparison and accuracy determination. In some embodiments there may be no existing Z-coordinate for a reference feature, and thus any Z-coordinate that is judged to be reasonably accurate is determined to be better than none at all. In another embodiment, Z-coordinate accuracies for the same reference feature from different sources may vary. Z-coordinate accuracy estimator 239 performs a comparison to estimate which Z-coordinate has greater accuracy and should be kept as the registration information associated with a feature in an image.

Following the comparison, existing georegistration information is updated with the georeferenced registration information of the first image if the georeferenced registration information of the first image is determined to be more accurate than that of the second image. In one embodiment, registration updater 240 accomplishes the update of georegistration information. This process of updating georegistration information as a part of the use of system 100 facilitates the constant refinement of geographic location information that is associated with images in image database 110.

At 1460 of flow diagram 1400, in one embodiment, the process of further comprises providing user access to the geographic location information and/or other geolocation information that has been determined by system 100 with respect to the first image. This can comprise output engine 230 pushing such information out to a user or other location or making such information available for user pull. For example, the third image and its associated georeferenced information can be made available for user access. In one embodiment, the user access is provided in exchange for payment of a fee.

Figure 15A:
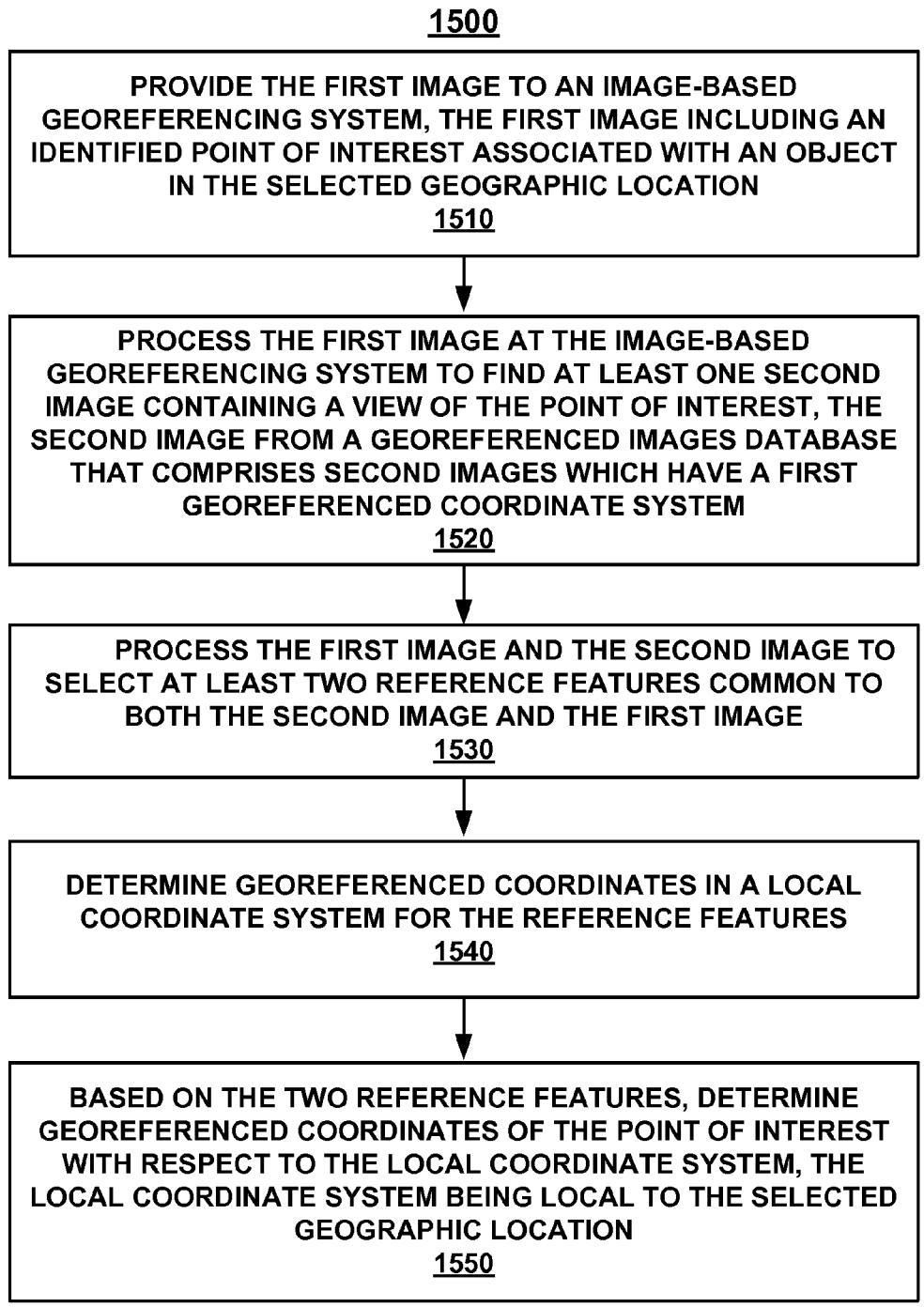
FIGS. 15A and 15B show a flow diagram of an example method of determining the geographic location of a point of interest in a first image at a selected geographic location, according to an embodiment.
Figure 15B:
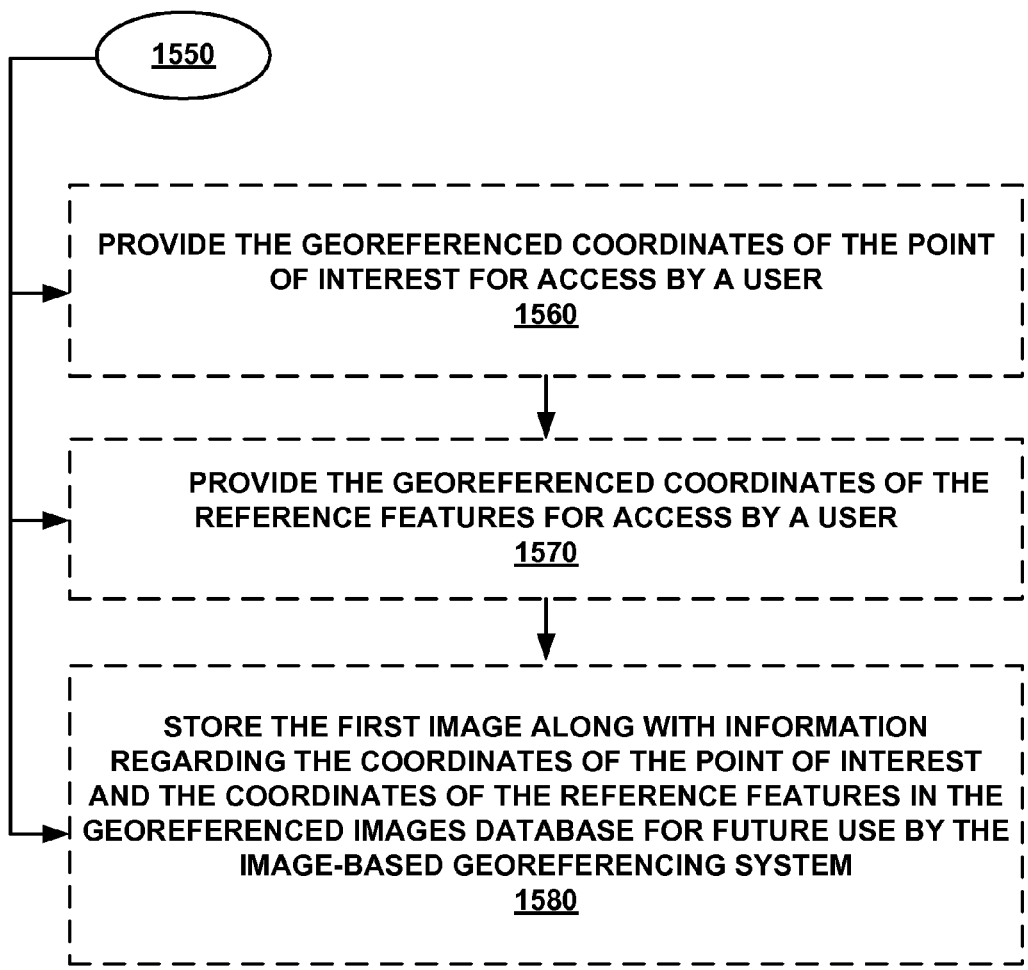

Example Method of Determining the Geographic Location of a Point of Interest in a First Image at a Selected Geographic Location FIGS. 15A and 15B illustrate a flow diagram 1500 of determining the geographic location of a point of interest in a first image at a selected geographic location, according to an embodiment. Elements of flow diagram 1500 are described below, with reference to elements of one or more of FIGS. 1-9. In one embodiment, flow diagram 1500 represents a method of operation of all or a portion of system 100.

At 1510 of flow diagram 1500, in one embodiment, a first image is provided to an image-based georeferencing system, such as system 100. The first image includes at least one point of interest on or associated with an object in the selected geographic location. The selected geographic location is, by default the geographic location related to both the location of capture of the camera which captured the first image and the field of view of the image. Typically these will both be very similar. It is appreciated that the first image comprises a terrestrial scene and that the object comprises a physical object with an identifiable feature. The object can be a natural or manmade object. Several examples of such images, objects, and identifiable features have been included and/or described previously herein. The point of interest, in one embodiment, is an identifiable feature that is selected and marked using feature selection processor 125.

The first image may be selected by or received from a user of system 100 or some portion thereof and then provided to system 100. For example, in one embodiment, the first image may be selected from a storage location on a network or on a storage device (e.g., data storage unit 1712 of FIG. 17), while in another embodiment, the first image may be received from a user who captures the first image with a digital camera, such as camera 120. By way of example and not of limitation, in one embodiment when image 405 is the first image point 6 is identified via feature selection processor 125 as the point of interest.

In one embodiment, geographic data associated with the first image may be received in conjunction with receipt of the first image. As previously described, this may include geographic location information regarding the location of a camera at time of capture of the first image and/or geographic location information regarding an identifiable feature in the field of view of the first image. Such geographic location information may be very general in nature, such as name of a town in which the first image was captured. Such geographic location information may also be very specific such as the coordinates of the camera during capture of the first image, or the surveyed coordinates of a feature visible in the field of view of the first image.

When the first image is provided, an indication of a local coordinate system for returning results may be provided as well. For example, a user may indicate that results returned from system 100 should be in the form of and comply with northing and easting for a particular locale, latitude and longitude (and elevation) in WGS84 coordinates, or some other coordinate system.

At 1520 of flow diagram 1500, in one embodiment, the first image is processed at the image-based georeferencing system to find at least one second image containing a view of the point of interest. The second image is from a georeferenced images database, such as image database 110, which comprises a plurality of images which have a first georeferenced coordinate system. For example, and with reference to FIG. 4C and FIG. 5, in one embodiment image identification processor 210 of system 100 identifies a second image (e.g. image 505) that corresponds to the first image (e.g., image 405). In one embodiment, image identification processor 210 utilizes techniques such as image matching to operate in a fully automated fashion for identifying the second image. However, in some embodiments, some level of human assistance may be also be involved in identifying the second image.

At 1530 of flow diagram 1500, in one embodiment, the first image and the second image are processed to select one or more reference features that are common to both the second image and the first image. In some embodiments, at least two common reference features are determined. In one embodiment, reference feature determiner 215 determines the common reference feature(s). For example, with reference to image 405 and image 505, in one embodiment, reference feature determiner 215 determines that points 2 and 3 are common to both images.

At 1540 of flow diagram 1500, in one embodiment, georeferenced coordinates are determined for the common reference feature(s). The georeferenced coordinates are determined for a local coordinate system that is local to the selected geographic region. Thus, in an embodiment where a preferred local coordinate system for returned results is provided, this is the coordinate system that is used as the local coordinate system. If no local coordinate system has been provided either a default coordinate system is used or a lookup is performed to determine a coordinate system that is locally utilized in the selected geographic region. In one embodiment, feature locator 220 locates coordinates of the common reference feature(s). For example, feature locator 220 may refer to georeferenced coordinates in the second image and/or search a geographic location information database/repository for georeferenced location information regarding the identified common reference feature(s). If these located coordinates are already in compliance with the local coordinate system, nothing more need be done. If not, coordinate system transformer 245 transforms the coordinates to equivalent coordinates in the local coordinate system for the selected geographic region.

At 1550 of flow diagram 1500, in one embodiment, based on the reference feature(s), georeferenced coordinates are determined for of the point of interest with respect to the local coordinate system. In one embodiment, feature locator 220 utilizes techniques described herein to locate the point of interest. With respect to the on going example, in one embodiment the feature locator 220 uses the geographic locations of reference features 2 and 3 to determine geographic coordinates for point 6.

At 1560 of flow diagram 1500, in one embodiment, the process of flow diagram 1500 also comprises providing the georeferenced coordinates of the point of interest for access by a user. In one embodiment, this comprises output engine 230 pushing such information out to a user or other location or making such information available for user pull. Following the above example, in one embodiment, image 705 and its associated georeferenced information regarding point 6 can be made available for user access. In one embodiment, the user access is provided in exchange for payment of a fee.

At 1570 of flow diagram 1500, in one embodiment, the process of flow diagram 1500 also comprises providing the georeferenced coordinates of the reference features for access by a user. In one embodiment, this comprises output engine 230 pushing such information out to a user or other location or making such information available for user pull. Following the above example, in one embodiment, image 705 and its associated georeferenced information regarding points 2 and 3 can be made available for user access. In one embodiment, the user access is provided in exchange for payment of a fee.

At 1580 of flow diagram 1500, in one embodiment, the process of flow diagram 1500 also comprises storing the first image along with information regarding the coordinates of the point of interest and the coordinates of the reference features in the georeferenced images database for future use by the image-based georeferencing system. In one embodiment this comprises output engine 230 storing such information in image database 110. Following the above example, in one embodiment, output engine 230 stores image 705 and its associated georeferenced information regarding points 2, 3, and 6 (and any other geolocated features therein) in image database 110 for future reference.

Example Method of Determining the Geographic Location of a Point of Interest Associated with an Object in a First Image at a Selected Geographic Location FIG. 16 illustrates a flow diagram 1600 of determining the geographic location of a point of interest associated with an object in a first image at a selected geographic location, according to an embodiment. Elements of flow diagram 1600 are described below, with reference to elements of one or more of FIGS. 1-9, 15A, and 15B.

At 1610 of flow diagram 1600, in one embodiment, a first image is provided to an image-based georeferencing system, such as system 100. The first image includes at least one point of interest associated with an object in the selected geographic location. It is appreciated that this is performed in the same manner as has been previously described in conjunction with 1510 of flow diagram 1500. Reference is made to this previous description for further description of actions accompanying 1610 of flow diagram 1600.

At 1620 of flow diagram 1600, in one embodiment, the first image is processed at the image-based georeferencing system to find at least one second image containing a view of the point of interest. The second image is associated with a first georeferenced coordinate system and includes georeferenced location data associated with features in the second image. The second image is from a georeferenced images database, such as image database 110, which comprises a plurality of images which have a first georeferenced coordinate system. For example, and with reference to FIG. 4C and FIG. 5, in one embodiment image identification processor 210 of system 100 identifies a second image (e.g. image 505) that corresponds to the first image (e.g., image 405). In one embodiment, image identification processor 210 utilizes techniques such as image matching to operate in a fully automated fashion for identifying the second image. However, in some embodiments, some level of human assistance may be involved in identifying the second image.

At 1630 of flow diagram 1600, in one embodiment, the first image is processed to determine a georeferenced location of the point of interest in the first georeferenced coordinate system. In one embodiment, this comprises reference feature determiner 215 determining one or more reference features that are common to both the first image and the second image. Depending on the location of the reference features with respect to the point of interest and the amount and quality of geographic location information provided in conjunction with the first image (e.g., location of camera at capture of the first image, coordinates of other features in the first image, and the like) anywhere from one to three or more common reference features may need to be determined in order to apply techniques of triangulation, scaling, and/or close-range photogrammetry to locate georeferenced coordinates of the point of interest. For example, with reference to image 405 and image 505, in one embodiment, reference feature determiner 215 determines that points 2 and 3 are common to both images.

From the reference feature(s) and/or geographic location information provided with the first image, feature locator 220 applies techniques described herein to determine georeferenced location of the point of interest in the first georeferenced coordinate system. In some embodiments, this may require utilizing coordinate system transformer 245 to transform dissimilar coordinates into the first coordinate system. For example, with reference to image 405 and image 505, in one embodiment, feature locator 220 employs scaling and or other techniques described herein to locate the coordinates of point 6 using the coordinates of points 2 and 3 which have been obtained from a geographic location information repository or other source.

At 1640 of flow diagram 1600, in one embodiment, the process of flow diagram 1600 also comprises providing the georeferenced location of the point of interest for access by a user. In one embodiment, this comprises output engine 230 pushing such information out to a user or other location or making such information available for user pull. Following the above example, in one embodiment, image 705 and its associated georeferenced information regarding point 6 can be made available for user access. In one embodiment, the user access is provided in exchange for payment of a fee. It is appreciated that information regarding the identified common reference features (e.g., points 2 and 3 in this example) can also be made available for user access in a similar fashion.

At 1650 of flow diagram 1600, in one embodiment, the process of flow diagram 1600 also comprises storing the first image along with information regarding the georeferenced location of the point of interest in a georeferenced images database for future use by the image-based georeferencing system. In one embodiment, this comprises output engine 230 storing such information in image database 110. Following the above example, in one embodiment, output engine 230 stores image 705 and its associated georeferenced information regarding point 6 and/or points 2 and 3 in image database 110 for future reference.

Example Computer System Environment

Figure 17:
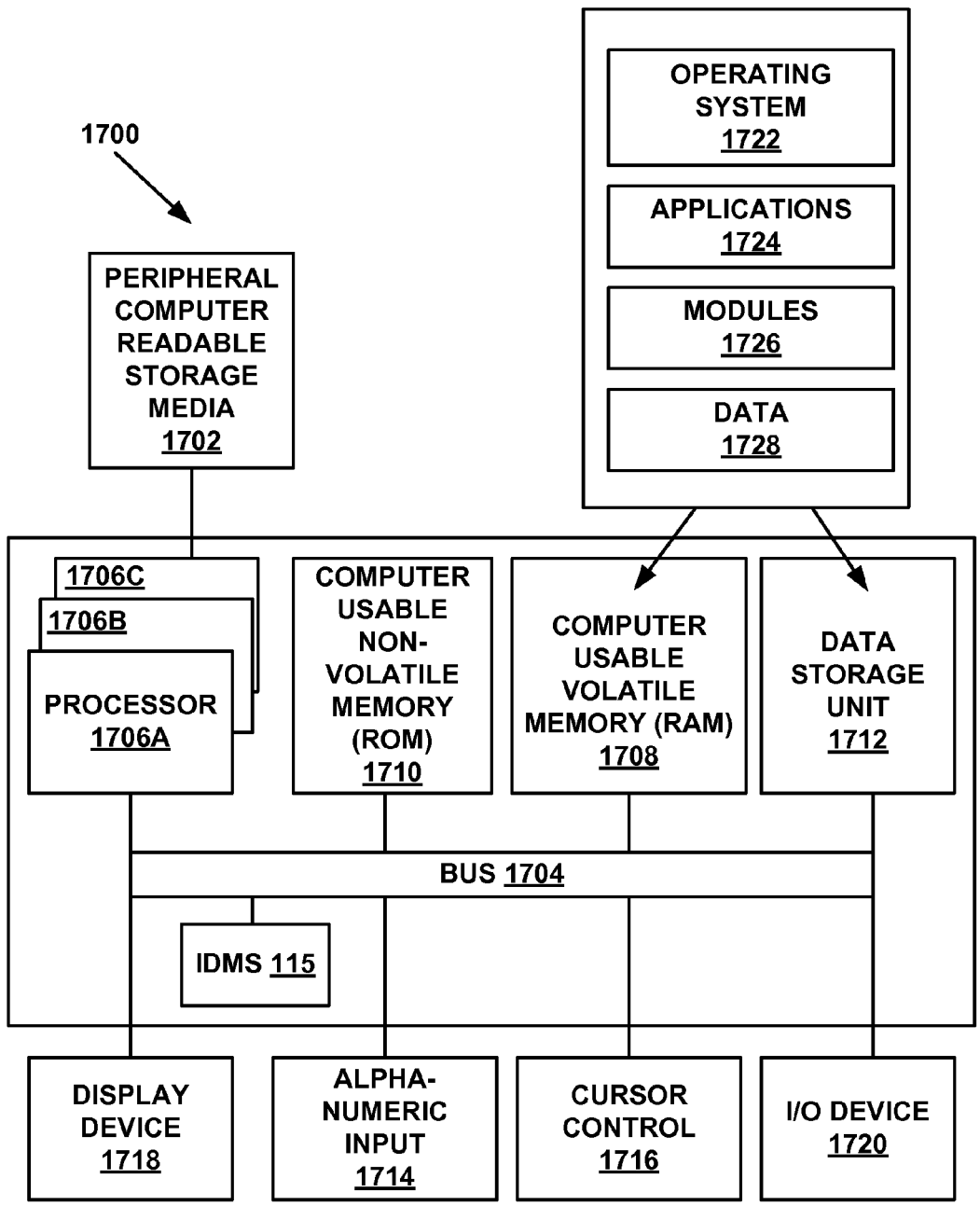
FIG. 17 is a block diagram of an example computer system with which, or upon which, various embodiments of the present invention may be implemented.

With reference now to FIG. 17, all or portions of some embodiments described herein are composed of computer-readable and computer-executable instructions that reside, for example, in computer-usable/computer-readable storage media of a computer system. That is, FIG. 17 illustrates one example of a type of computer (computer system 1700) that can be used in accordance with or to implement various embodiments which are discussed herein. It is appreciated that computer system 1700 of FIG. 17 is only an example and that embodiments as described herein can operate on or within a number of different computer systems including, but not limited to, general purpose networked computer systems, embedded computer systems, server devices, client devices, stand alone computer systems, mobile communication devices, media centers, handheld computer systems, multimedia devices, databases, database management systems, and the like. Computer system 1700 of FIG. 17 is well adapted to having peripheral computer-readable storage media 1702 such as, for example, a floppy disk, a compact disc, digital versatile disc, universal serial bus "flash" drive, removable memory card, and the like coupled thereto.

System 1700 of FIG. 17 includes an address/data bus 1704 for communicating information, and a processor 1706A coupled to bus 1704 for processing information and instructions. As depicted in FIG. 17, system 1700 is also well suited to a multi-processor environment in which a plurality of processors 1706A, 1706B, and 1706C are present. Conversely, system 1700 is also well suited to having a single processor such as, for example, processor 1706A. Processors 1706A, 1706B, and 1706C may be any of various types of microprocessors. System 1700 also includes data storage features such as a computer usable volatile memory 1708, e.g. random access memory (RAM), coupled to bus 1704 for storing information and instructions for processors 1706A, 1706B, and 1706C. System 1700 also includes computer usable non-volatile memory 1710, e.g. read only memory (ROM), coupled to bus 1704 for storing static information and instructions for processors 1706A, 1706B, and 1706C. Also present in system 1700 is a data storage unit 1712 (e.g., a magnetic or optical disk and disk drive) coupled to bus 1704 for storing information and instructions. System 1700 also includes an optional alphanumeric input device 1714 including alphanumeric and function keys coupled to bus 1704 for communicating information and command selections to processor 1706A or processors 1706A, 1706B, and 1706C. System 1700 also includes an optional cursor control device 1716 coupled to bus 1704 for communicating user input information and command selections to processor 1706A or processors 1706A, 1706B, and 1706C. In one embodiment, system 1700 also includes an optional display device 1718 coupled to bus 1704 for displaying information.

Referring still to FIG. 17, optional display device 1718 of FIG. 17 may be a liquid crystal device, cathode ray tube, plasma display device or other display device suitable for creating graphic images and alphanumeric characters recognizable to a user. Optional cursor control device 1716 allows the computer user to dynamically signal the movement of a visible symbol (cursor) on a display screen of display device 1718 and indicate user selections of selectable items displayed on display device 1718. Many implementations of cursor control device 1716 are known in the art including a trackball, mouse, touch pad, joystick or special keys on alphanumeric input device 1714 capable of signaling movement of a given direction or manner of displacement. Alternatively, it will be appreciated that a cursor can be directed and/or activated via input from alphanumeric input device 1714 using special keys and key sequence commands. System 1700 is also well suited to having a cursor directed by other means such as, for example, voice commands. System 1700 also includes an I/O device 1720 for coupling system 1700 with external entities. For example, in one embodiment, I/O device 1720 is a modem for enabling wired or wireless communications between system 1700 and an external network such as, but not limited to, the Internet.

Referring still to FIG. 17, various other components are depicted for system 1700. Specifically, when present, an operating system 1722, applications 1724, modules 1726, and data 1728 are shown as typically residing in one or some combination of computer usable volatile memory 1708 (e.g., RAM), computer usable non-volatile memory 1710 (e.g., ROM), and data storage unit 1712. In some embodiments, all or portions of various embodiments described herein are stored, for example, as an application 1724 and/or module 1726 in memory locations within RAM 1708, computer-readable storage media within data storage unit 1712, peripheral computer-readable storage media 1702, and/or other tangible computer readable storage media.

As shown, in one embodiment, image database management system (IDMS) 115 is coupled with bus 1704 as a portion of computer system 1700 and controls actions of a processor 1706 and/or other portions of computer system 1700. It is appreciated that, in some embodiments, a portion of image database management system 115 exists as an application 1724 and/or module 1726 in computer-readable storage media (e.g., RAM 1708, data storage unit 1712, peripheral computer readable storage media 1702, or the like) that is a part of or is accessible by computer system 1700. It is also appreciated that, in some embodiments, a portion of image database 110 exists as data 1728 and or an application 1724 in computer readable storage media (e.g., RAM 1708, data storage unit 1712, peripheral computer readable storage media 1702, or the like) that is a part of or is accessible by computer system 1700.

Accurate Digitization from a Georeferenced Image

Figure 18:
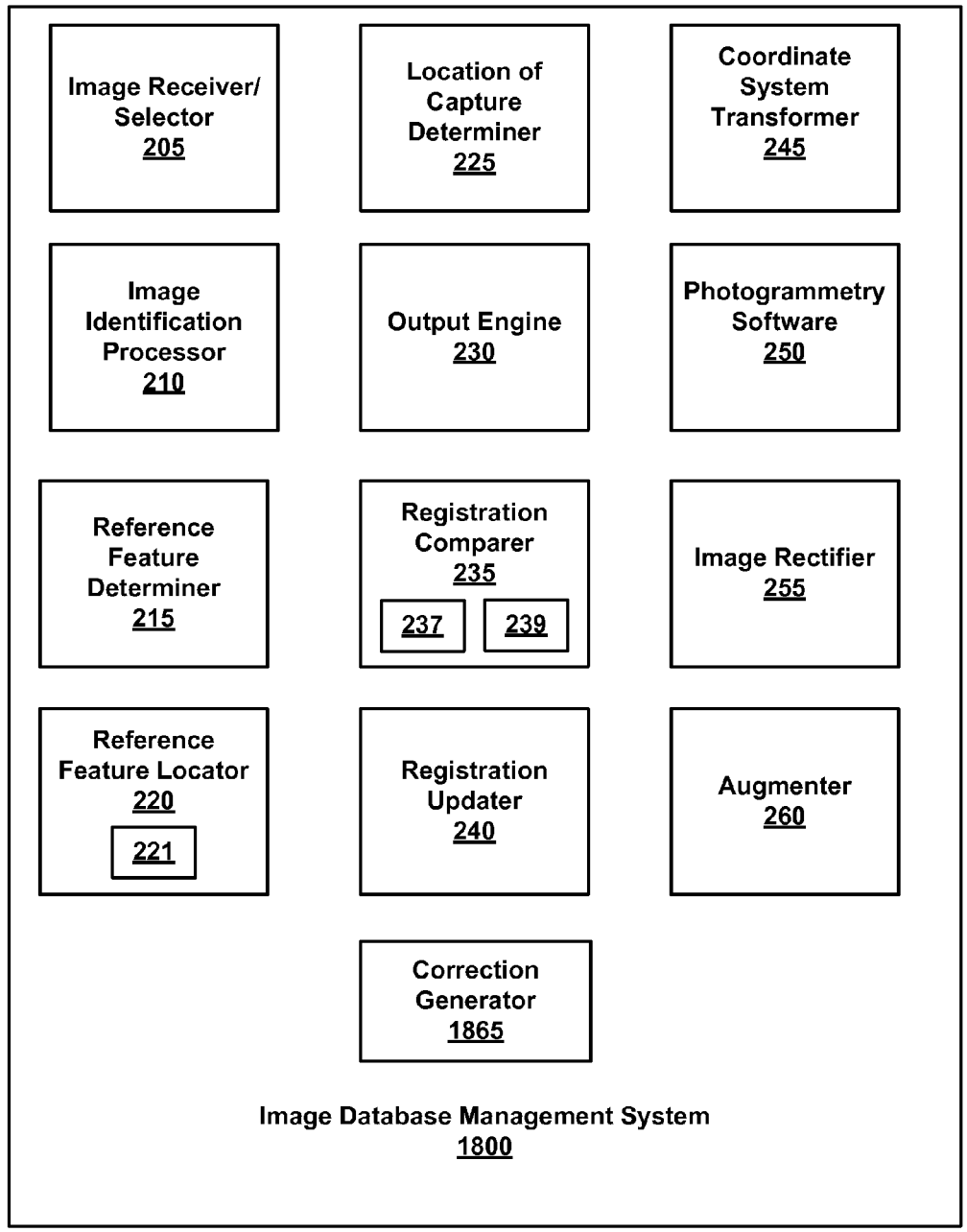
FIG. 18 is an example block diagram of an image database management system, in accordance with an embodiment.

FIG. 18 is an example block diagram of an image database management system 1800, in accordance with an embodiment. In one embodiment image database management system 1800 comprises a component of image-based georeferencing system 100. It is noted that image database management system 1800 comprises components previously described with reference to image database management system 115 of FIG. 2. For the sake of brevity, not all of the components previously described in the discussion of FIG. 2 will be described again in the discussion of image database management system 1800.

Figure 22:
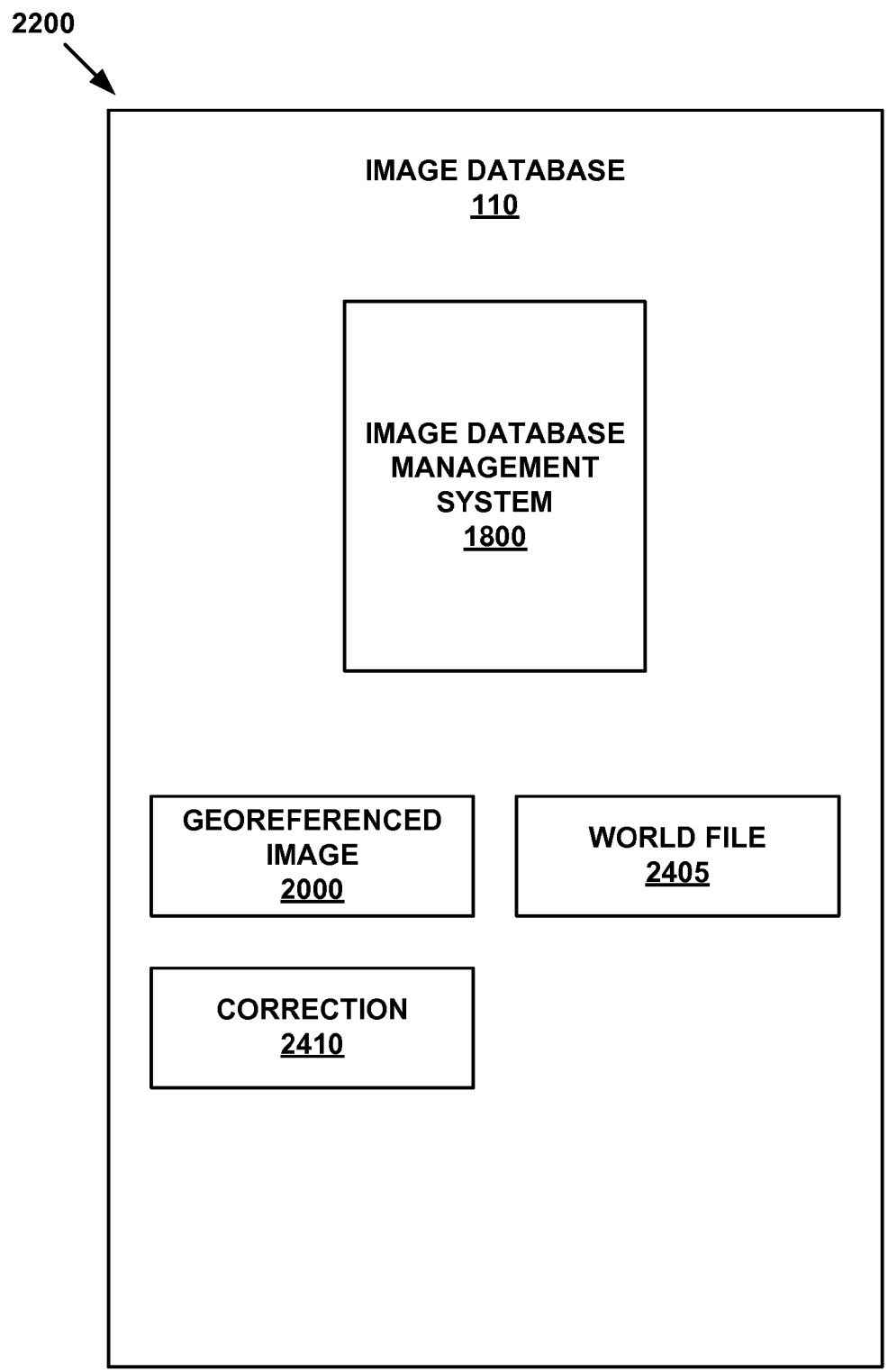
FIG. 22 is an example image-based georeferencing system, in accordance with an embodiment.

For the sake of the following discussion, the term "digitization" means the process of identifying the X-Y pixel coordinates of a point of interest in an aerial photograph, then calculating the corresponding real-world coordinates from the georeferencing parameters. A georeferenced image includes pixel data, in JPG/TIF or other file formats, plus the georeferencing parameters which are usually contained in a "world file" with an extension such as JPW or TFW. As an example, in FIG. 22 georeferencing system 2200 comprises a georeferenced image 2000 and an associated world file 2205 which is used to derive a set of georeferenced coordinates of a point of interest within georeferenced image 2000. A world file is an ASCII text file containing specially formatted parameters concerning the location, rotation, and scale of an image relative to the surface of the Earth. This information is frequently used by GIS and image processing software to display the image. The world files are configured with six lines of decimal numbers. An example world file is shown below:

0.99995152055043
−0.00006547980963
0.00002912694585
−0.99998076995610
2470000.06342877401039
5747499.77289512474090

The first line refers to the scale of a pixel in the x-direction. The second and third lines describe the rotation about the y-axis and x-axis respectively. The fourth line describes the scale of a pixel in the y-direction. The fifth line describes the x-coordinate at the center of the top left pixel in the image while the sixth line describes the y-coordinate at the center of the top left pixel in the image. The value of the fourth line is negative because of differences in how the origins of an image are described versus how the origins of the UTM coordinate system are described. Using the parameters of a world file, the real-world coordinates for any selected pixel of an image can be calculated. The user can simply select a pixel in the image (e.g., a mouse click) to capture the coordinates of a point of interest instead of directly measuring the coordinates of that point using a GNSS receiver.

Often, the georeferenced coordinates of an object (e.g., from georeferenced image 2000 of FIG. 20) will not describe the position of a point of interest with sufficient precision for a particular user. In other words, the world file associated with georeferenced image 2000 comprises data which inaccurately describes the real-world coordinates of objects shown in georeferenced image 2000. This can occur due to errors inherent in the process of creating the georeferenced images such as the limited resolution of the images, human errors from the process of identifying control points in the images, and using poor quality control coordinates. For example, a coordinate obtained by digitization from a georeferenced satellite image may have an error of several meters, while a user may desire a precision of 1-3 feet.

In FIG. 18, image database management system 1800 further comprises a correction generator 1865. In accordance with one embodiment, correction generator 1865 is configured to determine a correction (e.g., 2210 of FIG. 22) which describes a difference between a set of coordinates collected at a point of interest and a set of georeferenced coordinates which describe the position of the same point of interest within georeferenced image 2000. This correction can be applied to the point of interest, as well as to other points of interest within the same georeferenced image 2000 to more precisely report their positions as well. When correction 2210 is applied to the georeferenced coordinates associated with a point of interest in georeferenced image 2000, the actual set of coordinates of the point of interest on the ground will be output. Thus, a user accessing georeferenced image 2000 will be presented with the set of coordinates collected at the point of interest rather than a set of georeferenced coordinates extrapolated from some reference point outside of georeferenced image 2000. In one embodiment, georeferencing system 2200 can perform a translation process in which other points shown in georeferenced image 2000 are "corrected" based upon the correction applied to the point of interest. The translation can include, but is not limited to, shifts, rotations and scales depending upon the desired level of precision. In one embodiment, the information for applying and/or modifying shifts, rotations, and scales to pixels of georeferenced image 2000 is conveyed in correction 2210 of FIG. 22.

Figure 20:
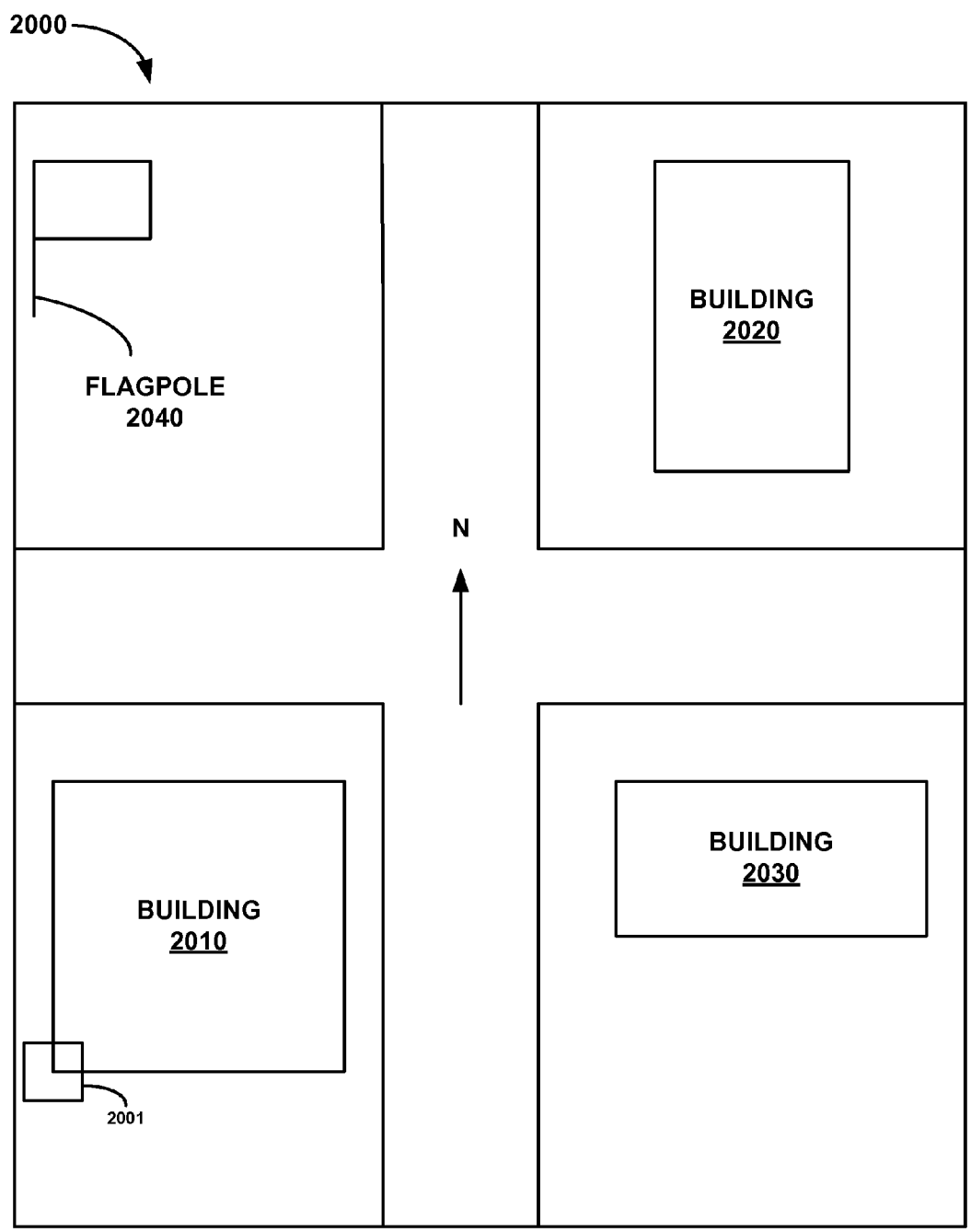
FIG. 20 shows an example georeferenced image in accordance with an embodiment.

For example, assume georeferenced image 2000 associates a set or georeferenced coordinates (e.g., 43°32'38.95"S, 172°35'26.34"E) corresponding to a pixel representing a point of interest (e.g., the southwest corner of building 2010 of FIG. 20).

In one embodiment, a user or other person with a GNSS receiver (e.g., 2001 of FIG. 20), or other navigation device, can go to the southwest corner of building 2010 and collect a set of coordinates which describe the position of that point of interest. When the actual position of that point of interest is measured, the collected set of coordinates are 43°32'39.00"S, 172°35'26.00"E. Correction generator 1865 then computes a correction in the North/South and East/West directions in the appropriate coordinate system based upon the difference between the set of coordinates collected at the southwest corner of building 2010 and the set of georeferenced coordinates associated with the southwest corner of building 2010 which are provided by georeferenced image 2000. Thus, for example, correction generator 1865 would output a correction of 0.05"S, 0.34"W. This indicates that the actual measured position of the point of interest is 0.05" South of the set of georeferenced coordinates associated with that point of interest in georeferenced image 2000 and 0.34" West of the set of georeferenced coordinates. It is noted that other formats of corrections can be generated by correction generator 1865 such as actual distances between the set of coordinates collected at the point of interest and the georeferenced coordinates associated with that point of interest in georeferenced image 2000. Alternatively, correction 2210 can be formatted to be used in conjunction with a world file (e.g., 2205 of FIG. 22) describing a modification to the location, rotation, and scale of georeferenced image 2000 relative to the surface of the Earth.

Thus, embodiments described herein permit updating the data describing the location of pixels of a georeferenced image, as well as their rotation and scale. For example, correction 2210 comprises information used to modify the pixel scale and/or location of a pixel(s) in world file 2205 in accordance with an embodiment. In one embodiment, correction 2210 is used to modify or replace the data within world file 2205. In so doing, the coordinates associated with each pixel position of georeferenced image 2000 will then more accurately describe the real-world coordinates of objects represented by those pixels. Thus, when a user selects a pixel of georeferenced image 2000, the set of georeferenced coordinates associated with that pixel position will more precisely describe the real-world coordinates of an object represented by that pixel within georeferenced image 2000. In another embodiment, correction 2210 is used in conjunction with the existing world file 2205 to more precisely describe the real-world coordinates of objects shown in georeferenced image 2000.

As described above, in one embodiment, coordinate system transformer 245 can transform the set of coordinates collected at the point of interest and the georeferenced coordinates from georeferenced image 2000 into a common desired coordinate system. As discussed above, registration comparer 235 is configured to compare georeferenced registration information, such as coordinates collected at a point of interest, to existing georeferenced registration information that is associated with an identified image to determine which is more accurate. In one embodiment, registration comparer 235 compares the set of coordinates collected at the point of interest with the georeferenced coordinates from georeferenced image 2000 to determine which set of coordinates is more accurate or more precisely describes the position of the point of interest. It is noted that a user can designate that the set of coordinates collected at the point of interest is more accurate than existing georeference information for that point of interest.

In one embodiment, provenance checker 237 accesses the source of the georeferenced coordinates from georeferenced image 2000 with the source of the set of coordinates received from GNSS receiver 2001. Provenance checker 237 will then determine which set of coordinates more precisely describes the position of the point of interest. In one embodiment, if the set of coordinates collected at the point of interest is determined to be more precise, registration updater 240 will update, or replace, the previously existing set of georeferenced coordinates with the set of coordinates collected at the point of interest. As a result, a user accessing georeferenced image 2000 will be presented with the set of coordinates collected at the point of interest rather than the previous set of georeferenced coordinates. The provenance of accuracy includes information such as the source of the georeferenced position fix and the level of accuracy associated with the source. Provenance checker 237 can ascertain the source of a position fix from metadata, when available, that is associated with a position fix. Similarly, accuracy information associated with the position fix source may also be included with the metadata associated with an image or a position fix (e.g., how many GPS satellites were in view and being used when a position fix was taken, expected centimeters of accuracy of a position fix, whether/what type of enhancement/augmentation was utilized with GNSS signals, and the like).

It is noted that the selection of a point of interest may be identified prior to collecting the set of coordinates using image 2000 and image database management system 1800. In one embodiment, feature locator 220 can determine that no geographic location information is available for objects and/or points of interest within georeferenced image 2000. In response, feature locator 220 can initiate a message to collect at least one set of coordinates of a feature shown within georeferenced image 2000. This will improve the level of precision in determining the position of objects and/or points of interest within georeferenced image 2000. In one embodiment, the point of interest is manually selected and identified within georeferenced image 2000. For example, a selected point of interest may be an easily identified object which is represented by a single pixel of georeferenced image 2000. In another embodiment, feature locator 220 can be used to select a point of interest within georeferenced image 2000 and communicate that point to an operator of a GNSS receiver 2001 the location of the point of interest. The selection of the point of interest can be in response to the message initiated by feature locator 220. In one embodiment, accuracy validator 221 is configured to validate a level of accuracy associated with geographic location information accessed by feature locator 220. In one embodiment, if accuracy validator 221 determines that an insufficient level of precision has been used to measure the position of a point of interest, it will initiate the sending of a message measure the position the said point of interest with a greater level of precision. Furthermore, if feature locator 220 determines that there is not a usable position measurement within image database 110, it can generate a message to measure a position(s) which can be used to determine the position of points of interest within georeferenced image 2000.

Again, when accuracy data is not included with a position fix or an image, and/or cannot be determined by provenance checker 237, then registration comparer 235, in one embodiment, determines accuracy of a position fix through use of a lookup-type table or list that assigns default accuracies to position fix sources and/or establishes a hierarchy of accuracy from best to least for different types of position fix sources. A hierarchical ranking or attributed accuracy may be altered over time. For example, as registration accuracy of Google Earth™ improves or degrades, its ranking in a hierarchy can be increased and decreased relative to other types of position fix sources, as is appropriate. Thus, registration comparer 235 can determine that the set of coordinates collected at the point of interest more precisely describe the actual position of the point of interest than the set of georeferenced coordinates previously associated with that point of interest within a georeferenced image.

Registration comparer 235 decides if the set of coordinates collected at the point of interest (e.g., a GNSS position fix) is more or less accurate than the set of georeferenced coordinates currently associated with the point of interest within georeferenced image 2000. If so, registration updater 240 is employed to update one or more position fixes in georeferenced image 2000 by shifting the less accurate coordinates by a correction value that compensates for the difference between the less accurate and more accurate position. When a comparison determines that greater accuracy is available for a position fix of a point, information in image database 110 is updated by registration updater 240 in a similar manner by shifting the less accurate coordinates by a value that compensates for the difference between the less accurate and more accurate position. As described above, in one embodiment, this comprises modifying or replacing the existing world file 2205 based upon the correction 2210 generated by correction generator 1865. Thus, using correction 2210, the reference coordinates comprising world file 2205 can be modified to more accurately describe the real-world coordinates of an object represented by a pixel of georeferenced image 2000. In other words, based upon correction 2210, world file 2205 can be modified so that each pixel of georeferenced image 2000 more accurately conveys the real-world coordinates of objects shown in the image. As an example, if a second point of interest is within a given distance from the southwest corner of building 2010 (e.g., the southeast corner of building 2010), registration updater 240 can apply the same correction to the set of georeferenced coordinates which describe the position of the southeast corner of building 2010 as were used to correct the georeferenced coordinates which describe the position of the southwest corner of building 2010. In other words, the same correction which was applied to the first point of interest can be applied to the second point of interest as long as they are not too far apart. Again, this can be accomplished by modifying or replacing world file 2205 based upon correction 2210 in one embodiment. It is noted that while the georeferenced set of coordinates previously used to describe the position of a point of interest can be replaced by the received set of coordinates collected at the point of interest, correction 2210 derived by correction generator 1865 can still be used to more precisely describe the positions of other points of interest shown in georeferenced image 2000.

When more than one set of coordinates is obtained during the course of gathering data, an alternate adjustment can be made to the data in the database by registration comparer 235. The general approach to making such an adjustment is often done via the method of least squares. With multiple new control data points, the method is referred to as 'multiple regression least squares.' These techniques are well-known in the optimization arts. By one or more of these techniques, the adjustment to the original data points is made via a curve fitting process whereby the error differences between the new high accuracy data points and the points under adjustment are minimized, over the ensemble of all adjusted points. This data can be stored in correction 2210 as well. Weighting of the reference data points can enhance the value of the contribution of higher-accuracy newly-found points. This can be useful when the area depicted in georeferenced image 2000 covers a large area. As an example, when georeferenced image 2000 depicts a large area, a correction (e.g., 2210) applied to one region will not result in an accurate correction of position when applied to a different region. In one embodiment, a conformal transformation may be performed on the sets of coordinates collected at the plurality of points. Referring again to FIG. 20, a user can collect the sets of coordinates for the southwest corner of building 2010, the northeast corner of building 2020, the southeast corner of building 2030, and of a flagpole 2040. Additionally, by collecting the coordinates of at least two points of interest shown in georeferenced image 2000, image database management system 1800 can more accurately determine a scale for measuring distances of and between objects shown in georeferenced image 2000. As a result, the pixel scale in either or both of, the x-direction and y-direction of world file 2205 can be modified to more accurately convey the real-world distance represented by each pixel of georeferenced image 2000.

In one embodiment, the measurement and/or calibration of georeferenced image 2000 can occurs in separate operations by one or more users. For example one operator with a high accuracy GNSS receiver can go to the area represented in georeferenced image 2000 and collect the coordinates of points of interest such as coordinates for the southwest corner of building 2010, the northeast corner of building 2020, the southeast corner of building 2030, and of a flagpole 2040. In one embodiment, the operator can then calculate the correction 2410 (e.g., either in real-time at the area represented by georeferenced image 2000, or at another time and/or location). Again, it is noted that for larger areas, correction 2410 can convey the results of a conformal transformation performed on the sets of coordinates collected at the plurality of points. Using correction 2410, other workers in the area represented by georeferenced image 2000 can use georeferenced image 2000 to more precisely locate other objects and points of interest. Thus, if the other workers are using less precise GNSS receivers, or if conditions prevent accurate position determination, the other workers can use georeferenced image 2000, in conjunction with correction 2410, to determine more precisely the coordinates of other objects or points of interest in the area represented by georeferenced image 2000.

Figure 19:
FIG. 19 is a flow diagram of an example method of implementing accurate digitization from a georeferenced image in accordance with an embodiment.

FIG. 19 is a flow diagram of an example method 1900 of implementing accurate digitization from a georeferenced image in accordance with an embodiment. In operation 1910, at least one set of coordinates which have been measured at a point of interest is received. As described above, a user can position GNSS receiver 2001 at the southwest corner of building 2010 and collect a set of coordinates for that position. As described above, this set of coordinates can be used to replace a set of georeferenced coordinates for this point which were previously used in georeferenced image 2000 to describe the position of the point of interest. In one embodiment, registration comparer 235 can determine whether a set of coordinates collected at a point of interest are more precise in describing the position of the point of interest than a corresponding set of georeferenced coordinates used by a georeferenced image to describe the position of the same point of interest.

In operation 1920, a correction is determined which describes a difference between the at least one set of coordinates and a set of georeferenced coordinates from a georeferenced image of the point of interest which describes the position of said point of interest. In one embodiment, correction generator 1865 determines a correction 2210 which describes the difference between the set of coordinates collected at a point of interest and a corresponding set of georeferenced coordinates used by a georeferenced image to describe the position of the same point of interest. In one embodiment, the correction can be applied in a translation process to other sets of georeferenced coordinates from the georeferenced image. In so doing, other georeferenced coordinates in the georeferenced image can be located with greater precision than was previously realized. As an example, the correction 2210 can be used to modify or replace data in world file 2205. As a result, the location associated with each pixel of georeferenced image will be modified as well. Furthermore, a plurality of sets of coordinates can be collected and used to correct georeferenced coordinates over a larger area and to provide a scale for measuring objects and distances in the georeferenced image.

FIG. 21 is a flow diagram of an example computer implemented method in accordance with an embodiment. In operation 2110, a computer system is used to receive at least one set of coordinates which have been measured at a point of interest. As described above, a user can position GNSS receiver 2001 at the southwest corner of building 2010 and collect a set of coordinates which describe the location of that point of interest.

In operation 2120, the computer system is used to determine a correction which describes a difference between the at least one set of coordinates and a set of georeferenced coordinates which describe the position of the point of interest within a georeferenced image. Correction generator 1865 is used in accordance with various embodiments to determine a correction which describes the difference between the set of coordinates collected at a point of interest and a corresponding set of georeferenced coordinates used by a georeferenced image to describe the position of the same point of interest.

In operation 2130, the computer system is used to apply the correction to a second set of coordinates of the georeferenced image to describe the position of a second point of the georeferenced image. In accordance with an embodiment, image database management system 1800 can apply the correction to other points of interest within georeferenced image 2000 to determine the position of the other points of interest. Additionally, a plurality of sets of coordinates can be collected and used to correct georeferenced coordinates over a larger area and to provide a scale for measuring objects and distances in the georeferenced image. In one embodiment, the set of georeferenced coordinates which previously were used to describe the position of the point of interest is replaced with the received set of coordinates collected at the point of interest. However, the correction derived by correction generator 1865 is still used to translate the positions of other points of interest in the georeferenced image to give a more precise description of their location.

Example embodiments of the subject matter are thus described. Although various embodiments of the subject matter have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A non-transitory computer-readable storage medium comprising instructions embodied thereon which, when executed, cause a computer system to perform method of implementing accurate digitization from a georeferenced image, said method comprising:

receiving at least one set of coordinates which have been measured at a point of interest;

determining a correction which describes a difference between said at least one set of coordinates and a set of georeferenced coordinates from a georeferenced image of said point of interest which describes the position of said point of interest;

comparing said at least one set of coordinates with said set of georeferenced coordinates;

determining that said at least one set of coordinates more precisely describes the position of said point of interest;

replacing said set of georeferenced coordinates with said at least one set of coordinates to describe the position of said point of interest within said georeferenced image; and applying said correction to a second set of georeferenced coordinates of said georeferenced image to describe the position of a second point of said georeferenced image.

2. The non-transitory computer-readable storage medium of claim 1 further comprising instructions for:

receiving a plurality of sets of coordinates which have been measured at a plurality of points of interest; and using said plurality of sets of coordinates to determine the position of a second point of interest within said georeferenced image.

3. The non-transitory computer-readable storage medium of claim 1 wherein said at least one set of coordinates is collected in response to a message to measure the position of said point of interest.

4. The non-transitory computer-readable storage medium of claim 1 wherein said at least one set of coordinates is collected in response to a message to measure the position of said point of interest with a greater level of precision.

5. The non-transitory computer-readable storage medium of claim 1 further comprising:

modifying data in a world file associated with said georeferenced image based upon said correction and wherein said world file is used to derive a set of georeferenced coordinates of said point of interest within said georeferenced image.

6. A computer system for implementing accurate digitization from a georeferenced image comprising:

a feature locator implemented with hardware of said computer system and configured to receive at least one set of coordinates which have been measured at a point of interest;

a registration comparer implemented with hardware of said computer system and configured to determine whether a level of accuracy associated with said at least one set of coordinates is greater than a second level of accuracy associated with a set of georeferenced coordinates which describes the position of said point of interest within a georeferenced image;

a correction generator implemented with hardware of said computer system and configured to determine a correction which describes a difference between said at least one set of coordinates and said set of georeferenced coordinates; and a registration updater configured to apply said correction to a second set of georeferenced coordinates of said georeferenced image to describe the position of a second point of interest within said georeferenced image and the registration updater further configured to replace said set of georeferenced coordinates with said at least one set of coordinates to describe the position of said point of interest within said georeferenced image.

7. The computer system of claim 6 wherein said registration updater is further configured to modify data in a world file associated with said georeferenced image based upon said correction and wherein said world file is used to derive a set of georeferenced coordinates of said point of interest within said georeferenced image.

8. The computer system of claim 6 wherein said feature locator is further configured to receive a plurality of coordinates which have been measured at a plurality of points of interest and wherein said correction is used to describe the position of a second point of interest within said georeferenced image.

9. The computer system of claim 6 wherein said feature locator is configured to initiate a message to measure the position of said point of interest.

10. The computer system of claim 6 further comprising:

an accuracy validator configured to initiate a message measure the position of said point of interest with a greater level of precision.

11. A computer implemented method comprising:

using a computer system to receive at least one set of coordinates which have been measured at a point of interest;

using said computer system to determine a correction which describes a difference between said at least one set of coordinates and a set of georeferenced coordinates which describe the position of said point of interest within a georeferenced image;

using said computer system to determine that said at least one set of coordinates more precisely describes the position of said point of interest within said georeferenced image than said set of georeferenced coordinates;

using said computer system to replace said set of georeferenced coordinates with said at least one set of coordinates to describe the position of said point of interest within said georeferenced image; and using said computer system to apply said correction to a second set of coordinates of said georeferenced image to describe the position of a second point of said georeferenced image.

12. The computer implemented method of claim 11 further comprising:

receiving by said computer system a plurality of coordinates which have been measured at a plurality of points of interest; and using by said computer system said plurality of coordinates to determine the position of a second point of interest within said georeferenced image.

13. The computer implemented method of claim 11 further comprising:

using said computer system to initiate a message to measure the position of said point of interest.

14. The computer implemented method of claim 11 further comprising:

using said computer system to initiate a message measure the position of said point of interest with a greater level of precision.

15. The computer implemented method of claim 11 further comprising:

using said computer system to modify data in a world file associated with said georeferenced image based upon said correction and wherein said world file is used to derive a set of georeferenced coordinates of said point of interest within said georeferenced image.

* * * * *